US012610350B2

(12) United States Patent
Oh et al.

(10) Patent No.: US 12,610,350 B2
(45) Date of Patent: Apr. 21, 2026

(54) METHOD AND APPARATUS FOR PERFORMING NETWORK FUNCTION FOR PACKET PROCESSING

(71) Applicant: SAMSUNG ELECTRONICS CO., LTD., Suwon-si (KR)

(72) Inventors: Beomseok Oh, Suwon-si (KR); Joonhwan Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 18/212,484

(22) Filed: Jun. 21, 2023

(65) Prior Publication Data

US 2024/0073869 A1      Feb. 29, 2024

Related U.S. Application Data

(63) Continuation      of      application      No. PCT/KR2023/008138, filed on Jun. 13, 2023.

(30) Foreign Application Priority Data

Aug. 31, 2022      (KR) ........................ 10-2022-0110333
Oct. 26, 2022      (KR) ........................ 10-2022-0139673

(51) Int. Cl.
*H04W 72/04*      (2023.01)
*H04W 92/22*      (2009.01)

(52) U.S. Cl.
CPC ............ *H04W 72/04* (2013.01); *H04W 92/22* (2013.01)

(58) Field of Classification Search
CPC ......... H04W 4/50; H04W 4/60; H04W 28/16; H04W 72/04; H04W 72/11;

(Continued)

(56) References Cited

U.S. PATENT DOCUMENTS 11,096,233 B2      8/2021   Wang et al.
11,546,236 B2      1/2023   Novlan et al.
(Continued)

FOREIGN PATENT DOCUMENTS

EP            3 836 729 A1      6/2021
KR      10-2020-0049904 A      5/2020
(Continued)

OTHER PUBLICATIONS

International Search Report and Written Opinion issued Sep. 21, 2023 by the International Searching Authority in International Patent Application No. PCT/KR2023/008138. (ISA/220, ISA/210 and ISA/237).

(Continued)

*Primary Examiner* — Jean A Gelin
(74) *Attorney, Agent, or Firm* — Sughrue Mion, PLLC

(57) ABSTRACT

A method, performed by a first distributed unit (DU), of performing communication in a wireless communication system may include performing, based on resource usage of the first DU, configuration of an inter-DU interface with a second DU requiring a connection with the first DU, obtaining information about at least one first radio unit (RU) to be migrated to the second DU from among at least one RU connected to the first DU, stopping resource allocation for at least one uplink packet associated with at least one user equipment (UE) connected to the first RU, and transmitting, based on the configured inter-DU interface, to the second DU, at least one downlink packet required to be transmitted to the first RU or the at least one UE.

17 Claims, 17 Drawing Sheets

(58) Field of Classification Search

CPC ... H04W 72/115; H04W 76/10; H04W 88/18; H04W 92/18; H04W 92/20; H04W 92/22

USPC ........................................................ 370/329

See application file for complete search history.

(56) References Cited

U.S. PATENT DOCUMENTS

| | | | |
|---|---|---|---|
| 11,582,642 | B2 | 2/2023 | Jang et al. |
| 12,010,739 | B2 | 6/2024 | Akl et al. |
| 2012/0096459 | A1 | 4/2012 | Miyazaki |
| 2013/0012218 | A1* | 1/2013 | Ohta .................... H04W 72/12 455/450 |
| 2017/0359848 | A1* | 12/2017 | Tenny ................... H04W 36/04 |
| 2018/0242349 | A1* | 8/2018 | Noh ....................... H04W 72/56 |
| 2018/0324780 | A1* | 11/2018 | Novlan ............... H04L 43/0811 |
| 2019/0116524 | A1* | 4/2019 | Isogawa ................ H04W 28/18 |
| 2019/0174391 | A1* | 6/2019 | Ode ....................... H04W 88/08 |
| 2020/0337113 | A1 | 10/2020 | Na et al. |
| 2021/0112471 | A1 | 4/2021 | Xu et al. |
| 2021/0266796 | A1 | 8/2021 | Majmundar et al. |
| 2021/0274406 | A1* | 9/2021 | Ode ................... H04W 36/0058 |
| 2021/0410031 | A1 | 12/2021 | Akl et al. |
| 2022/0014976 | A1 | 1/2022 | Luo et al. |
| 2022/0070879 | A1* | 3/2022 | Ryu ................... H04W 72/0473 |
| 2022/0070965 | A1* | 3/2022 | Li ......................... H04W 76/28 |
| 2022/0086672 | A1* | 3/2022 | Abedini ................ H04J 11/005 |
| 2022/0095251 | A1* | 3/2022 | Balasubramanian ..... H04L 5/14 |
| 2022/0272594 | A1 | 8/2022 | Anderson et al. |
| 2022/0361072 | A1* | 11/2022 | Zhu ....................... H04W 40/22 |
| 2022/0369182 | A1* | 11/2022 | Gundavelli ..... H04W 36/00835 |
| 2023/0388871 | A1* | 11/2023 | Guo .................. H04W 36/0069 |
| 2023/0403618 | A1* | 12/2023 | Zhang ............... H04W 36/0061 |
| 2023/0413111 | A1* | 12/2023 | Kotaru .............. H04W 28/0858 |
| 2024/0154724 | A1* | 5/2024 | Liu ........................ H04L 1/0041 |
| 2024/0214879 | A1* | 6/2024 | Chandrashekar ............................ H04W 36/0058 |
| 2024/0267967 | A1* | 8/2024 | Baek ................... H04W 88/085 |
| 2025/0048488 | A1* | 2/2025 | Li ......................... H04W 76/27 |
| 2025/0097792 | A1* | 3/2025 | Dural ................. H04W 36/023 |
| 2025/0105945 | A1* | 3/2025 | Shimoda .................. G06N 3/08 |

FOREIGN PATENT DOCUMENTS

| | | |
|---|---|---|
| KR | 10-2021-0086357 A | 7/2021 |
| WO | 2021/098085 A1 | 5/2021 |

OTHER PUBLICATIONS

3GPP, "3rd Generation Partnership Project; Technical Specification Group Radio Access Network; NG-RAN; F1 general aspects and principles (Release 17)", 3GPP TS 38.470, V17.1.0, Jun. 2022. (20 pages total).

"Multi-RAT Multi-Connectivity (MR-MC) for 5G-Advanced", Samsung, Agenda Item:9.0.3, 3GPP TSG RAN Meeting *93-e, Electronic Meeting, Sep. 13-17, 2021. (6 pages total).

Communication issued Sep. 9, 2025 by the European Patent Office in European Patent Application No. 23860614.9.

Samsung, "Virtualized RAN—vol. 2", Technical White Paper, Apr. 1, 2021, pp. 1-15, XP093189088. (16 pages total).

Working Group 1, "O-RAN Architecture Description", v07.00.05, O-RAN Alliance, O-RAN.WG1.O-RAN-Architecture-Description-v07.00, Technical Specification, Jul. 25, 2022, pp. 1-39, XP093127760. (39 pages total).

* cited by examiner

FIG. 5A

| D/C | P | SI | SN | Oct 1 |
| SN | | | | Oct 2 |
| SO | | | | Oct 3 |
| SO | | | | Oct 4 |
| DATA | | | | Oct 5 |
| ... | | | | |
| | | | | Oct N |

510

520

SN: Sequence Number

SO: Segmentation Offset

FIG. 5B

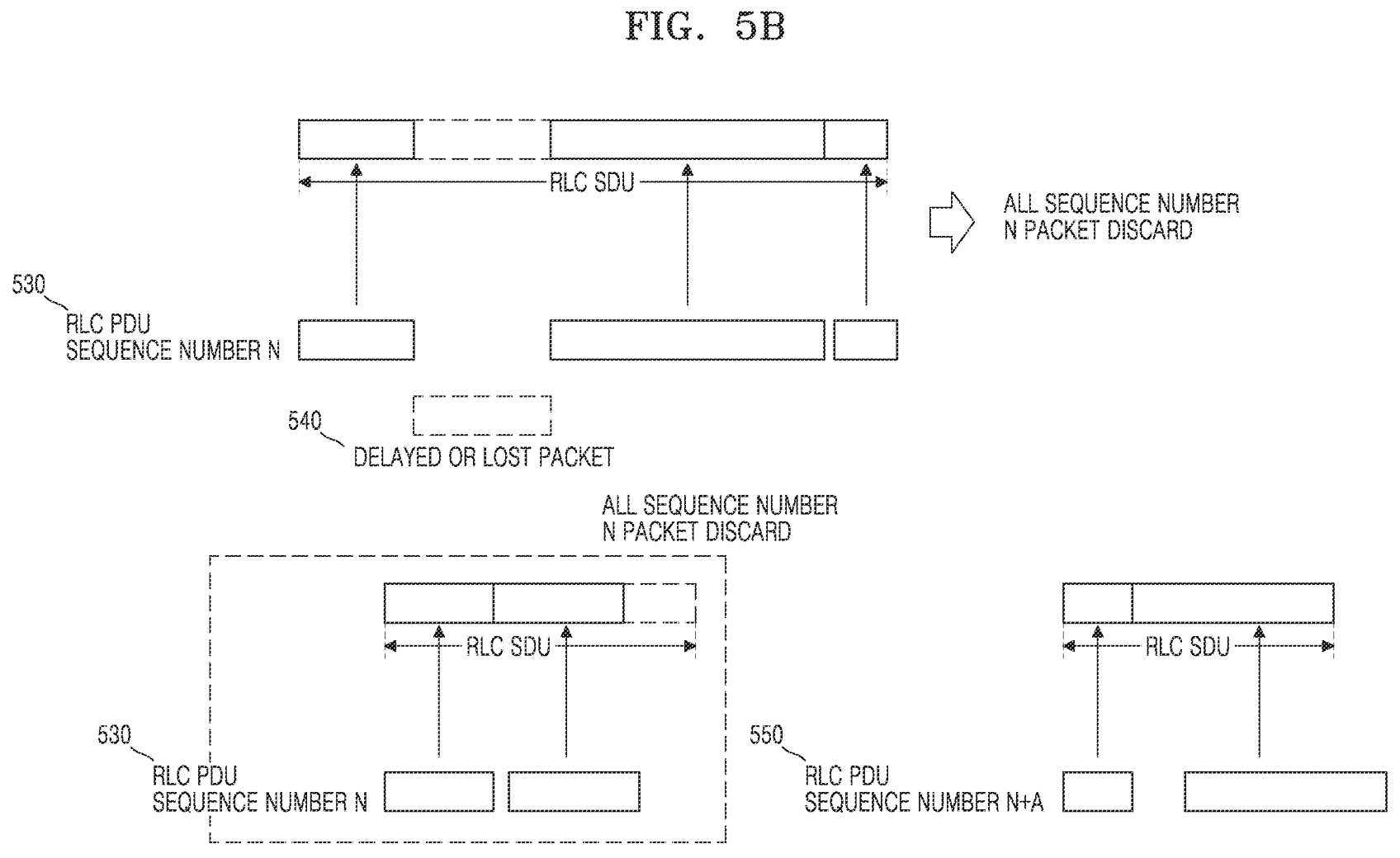

ALL SEQUENCE NUMBER
N PACKET DISCARD

RLC SDU

RLC PDU
SEQUENCE NUMBER N+A

550

RLC SDU

RLC PDU
SEQUENCE NUMBER N

530

ALL SEQUENCE NUMBER
N PACKET DISCARD

RLC SDU

540

DELAYED OR LOST PACKET

RLC PDU
SEQUENCE NUMBER N

Figure 9:
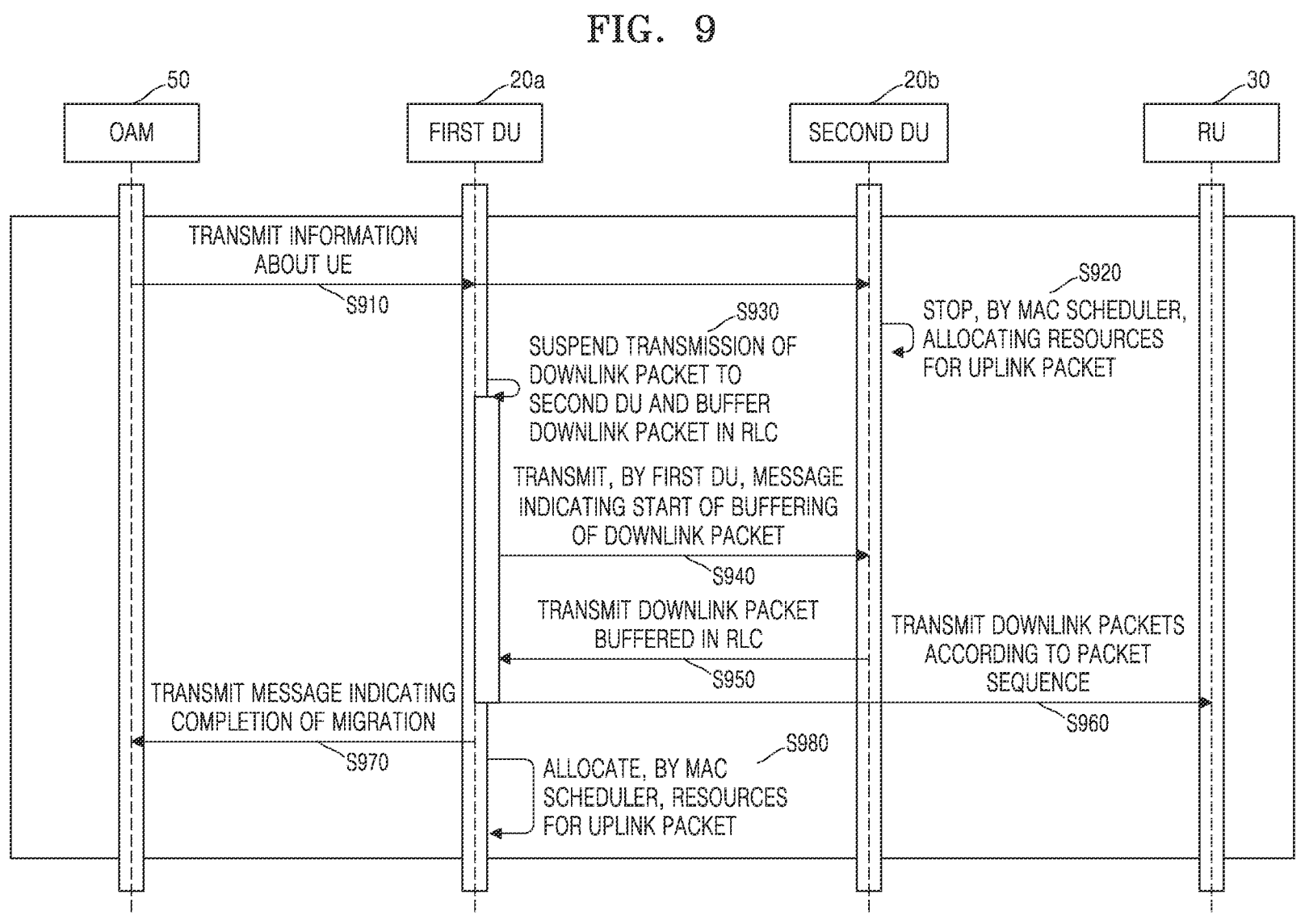

SECOND DU 20b

FIRST DU 20a

OAM 50

S910 TRANSMIT INFORMATION ABOUT UE

S920 STOP, BY MAC SCHEDULER, ALLOCATING RESOURCES FOR UPLINK PACKET

S930 SUSPEND TRANSMISSION OF DOWNLINK PACKET TO SECOND DU AND BUFFER DOWNLINK PACKET IN RLC

S940 TRANSMIT, BY FIRST DU, MESSAGE INDICATING START OF BUFFERING OF DOWNLINK PACKET

S950 TRANSMIT DOWNLINK PACKET BUFFERED IN RLC

S960 TRANSMIT DOWNLINK PACKETS ACCORDING TO PACKET SEQUENCE

S980 ALLOCATE, BY MAC SCHEDULER, RESOURCES FOR UPLINK PACKET

S970 TRANSMIT MESSAGE INDICATING COMPLETION OF MIGRATION

METHOD AND APPARATUS FOR PERFORMING NETWORK FUNCTION FOR PACKET PROCESSING

CROSS-REFERENCE TO RELATED APPLICATIONS

This application is a continuation of International Application No. PCT/KR2023/008138, filed on Jun. 13, 2023, which is based on and claims priority to Korean Patent Application No. 10-2022-0139673, filed on Oct. 26, 2022, in the Korean Intellectual Property Office, and Korean Patent Application No. 10-2022-0110333, filed on Aug. 31, 2022, in the Korean Intellectual Property Office, the disclosures of which are incorporated by reference herein in their entireties.

BACKGROUND

1. Field

The disclosure relates to a wireless communication system, and more particularly, to a method and apparatus for efficiently performing wireless network functions through dynamic scaling in/out.

2. Description of Related Art

Considering the development of wireless communication, technologies have been developed mainly for services targeting humans, such as voice calls, multimedia services, data services, or the like. After the commercialization of 5th-generation (5G) communication systems, an exponentially increasing number of connected devices are projected to be connected to communication networks. Examples of devices connected to networks may include vehicles, robots, drones, home appliances, displays, smart sensors installed in various infrastructures, construction machinery, factory equipment, etc. Mobile devices are expected to evolve into a variety of form factors such as augmented reality (AR) glasses, virtual reality (VR) headsets, and hologram devices, etc. In the 6th-generation (6G) era, efforts are being made to develop improved 6G communication systems to provide various services by connecting hundreds of billions of devices and objects. For these reasons, a 6G communication system is referred to as a beyond 5G communication system.

In a 6G communication system, a peak data rate is terabyte per second (Tbps) (i.e., 1000 gigabits per second (Gbps)), and a maximum air interface latency is 100 microseconds (μsec). That is, the 6G communication system is proposed to be 50 times as fast as 5G communication system and have 1/10 the radio latency thereof.

Implementation of 6G communication systems in a terahertz (THz) band (such as the frequency range between 95 gigahertz (GHz) and 3 THz) is under consideration to achieve such high data rate and ultra-low latency. In the THz band, the importance of technologies for guaranteeing a signal transmission distance (i.e., coverage) is expected to increase due to more severe path loss and atmospheric absorption compared to a millimeter-wave (mmWave) band introduced in 5G. It is necessary to develop, as the major technologies for securing coverage, radio frequency (RF) elements, antennas, novel waveforms which have better coverage than orthogonal frequency division multiplexing (OFDM), beamforming, multiple antenna transmission technologies, such as multiple input and multiple-output (massive MIMO), full dimensional MIMO (FD-MIMO), array antennas, and large scale antennas, and the like. In addition, novel technologies such as metamaterial-based lenses and antennas, high-dimensional spatial multiplexing technology using orbital angular momentum (OAM), reconfigurable intelligent surface (RIS), etc. have been discussed to improve the coverage of signals in the THz band.

Furthermore, to improve frequency efficiency and system networks for 6G communication systems, various technologies are being developed which include a full duplex technology for enabling uplink transmission and downlink transmission to simultaneously use the same frequency resource at the same time, a network technology using integration of satellites and high-altitude platform stations (HAPSs), a network structure innovation technology that supports mobile base stations and the like and enables optimization, automation, etc., of network operations, a dynamic spectrum sharing technology for avoiding collisions based on spectrum usage prediction, artificial intelligence (AI)-based communication technologies that utilize AI from the design stage and internalize end-to-end AI support functions to realize system optimization, and next-generation distributed computing technologies that realize services of a complexity level beyond the limits of user equipment (UE) computing capabilities by utilizing ultra-high performance communication and computing resources (e.g., mobile edge computing (MEC), cloud, etc.). In addition, ongoing attempts are being made to further enhance a connectivity between devices, further optimize networks, promote the softwarization of network entities, and increase the openness of wireless communications through the design of new protocols to be used in 6G communication systems, implementation of hardware-based security environments, development of mechanisms for safe use of data, and development of technologies on a method of maintaining privacy.

Due to the research and development of these 6G communication systems, the next hyper-connected experience is expected to be provided through hyper-connectivity of the 6G communication systems, which includes not only connectivity between things but also connectivity between humans and things. Specifically, 6G communication systems are expected to provide services such as truly immersive extended reality (XR), high-fidelity mobile holograms, digital replica, etc. In addition, by providing services such as remote surgery, industrial automation, and emergency response via the 6G communication systems through enhancement of security and reliability, such technologies may be applied in various fields such as industry, medical care, automobiles, home appliances, etc.

SUMMARY

Additional aspects will be set forth in part in the description which follows and, in part, will be apparent from the description, or may be learned by practice of the presented embodiments.

According to an aspect of the disclosure, a method performed by a first distributed unit (DU), of performing communication in a wireless communication system, according to an embodiment of the disclosure, may include performing, based on resource usage of the first DU, configuration of an inter-DU interface with a second DU requiring a connection with the first DU. In an embodiment of the disclosure, the method of performing communication may include obtaining information about at least one first radio unit (RU) to be migrated to the second DU from among at least one RU connected to the first DU. In an embodiment of the disclosure, the method of performing communication may include stopping resource allocation for uplink packets associated with at least one user equipment (UE) connected to the first RU. In an embodiment of the disclosure, the method of performing communication may include transmitting, based on the configured inter-DU interface, to the second DU, a downlink packet required to be transmitted to the first RU or the at least one UE.

According to an aspect of the disclosure, a method performed by a second DU, of performing communication in a wireless communication system, according to an embodiment of the disclosure, may include performing, based on resource usage of a first DU, configuration of an inter-DU interface with the first DU. In an embodiment of the disclosure, the method of performing communication may include obtaining information about at least one first RU to be migrated to the second DU from among at least one RU connected to the first DU. In an embodiment of the disclosure, the method of performing communication may include receiving, based on the configured inter-DU interface, from the first DU, a downlink packet required to be transmitted to the first RU or at least one UE connected to the first RU. In the method of performing communication, according to an embodiment of the disclosure, resource allocation for an uplink packet associated with the at least one UE may be stopped based on a request from the first DU.

According to an aspect of the disclosure, a method performed by an operations, administration, and maintenance (OAM) entity, of performing communication in a wireless communication system, according to an embodiment of the disclosure, may include identifying, based on resource usage of a first DU, whether to configure an inter-DU interface with a second DU. In an embodiment of the disclosure, the method of performing communication may include identifying at least one first RU to be migrated to the second DU from among at least one RU connected to the first DU. In an embodiment of the disclosure, the method of performing communication may include transmitting information about the first RU to the first DU or the second DU. In the method of performing communication, according to an embodiment of the disclosure, control of a downlink packet and an uplink packet may be performed between the first DU and the second DU, based on the information about the first RU.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5A is a diagram of a method of processing packets according to a packet sequence, according to an embodiment of the disclosure;

FIG. 5B is a diagram of a method of processing packets according to a packet sequence, according to an embodiment of the disclosure;

FIG. 9 is a diagram of a method of processing packets when scaling in, according to an embodiment of the disclosure;

FIG. 10 is a diagram of a method of processing an uplink packet, according to an embodiment of the disclosure;

FIG. 11 is a diagram of a method of processing downlink packets, according to an embodiment of the disclosure;

DETAILED DESCRIPTION

Figure 1:
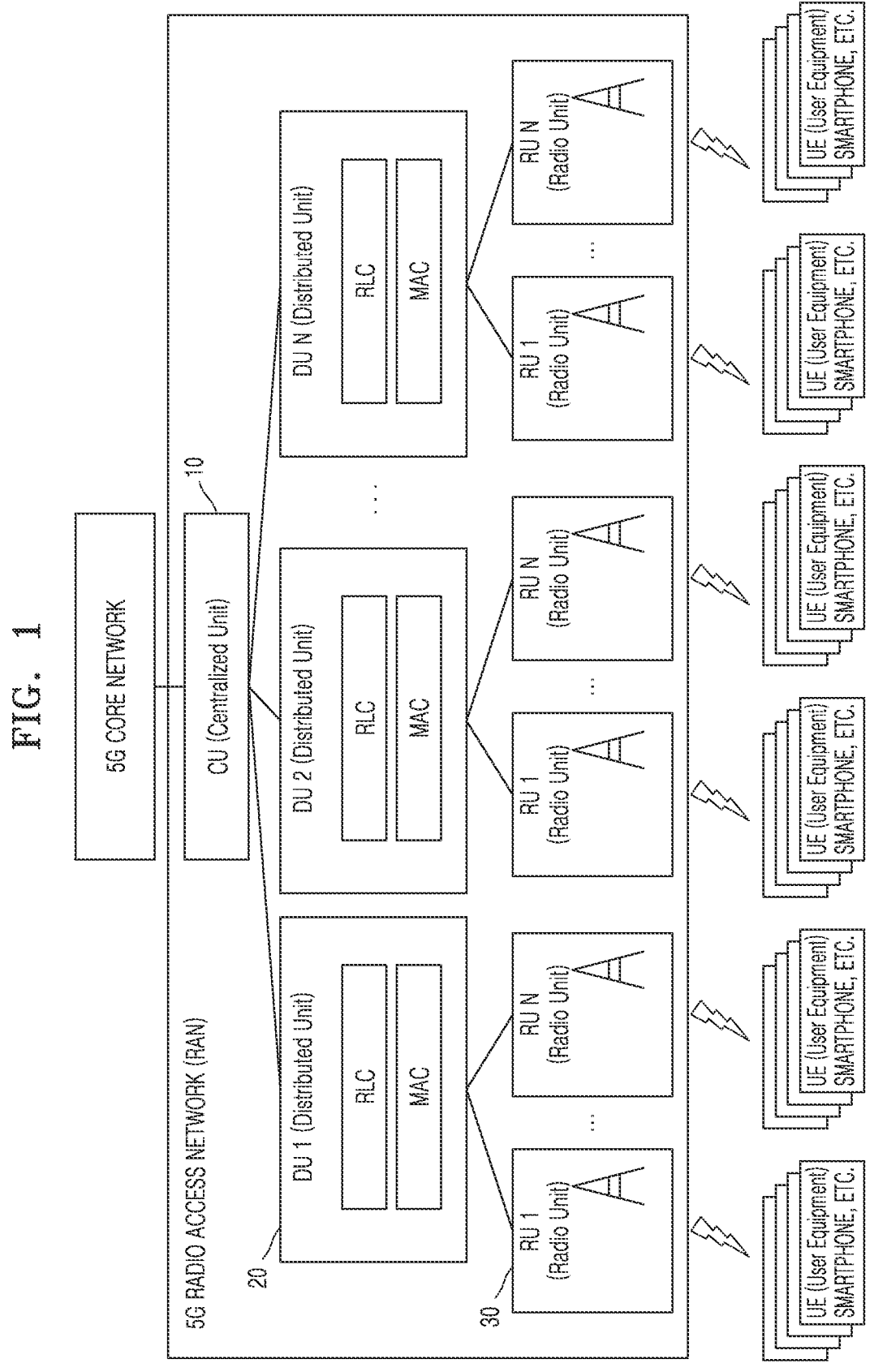
FIG. 1 is a diagram of an architecture of a radio access network (RAN)

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings.

Because the disclosure may be subject to various modifications and have numerous embodiments, particular embodiments of the disclosure are illustrated in the drawings and will be described in detail in the detailed description. However, the disclosure is not intended to be limited to particular embodiments thereof, and it should be understood that the disclosure covers all modifications, equivalents, and alternatives included in the spirit and technical scope of the numerous embodiments.

In describing an embodiment of the disclosure, related known technologies will not be described in detail when it is determined that the detailed descriptions may unnecessarily obscure the essence of the disclosure. In addition, numbers (e.g., first, second, etc.) used in the description of the specification are merely identifying symbols for distinguishing one component from another component.

The terms used in the present specification may be general terms currently widely used in the art based on functions described in the disclosure, but may be changed according to an intention of a technician engaged in the art, precedent cases, advent of new technologies, etc. Thus, the terms used herein should be defined not by simple appellations thereof but based on the meaning of the terms together with the overall description of the disclosure.

Various features recited in one claim category (e.g., a method claim) of the disclosure may also be claimed in another claim category (e.g., a system claim). In addition, an embodiment of the disclosure may include not only combinations of features specified in the claims but also various combinations of individual features within the claims. All the changes or modifications within the meaning and scope of the appended claims and their equivalents will be construed as being included in the scope of the disclosure.

Furthermore, in the disclosure, it should be understood that when a component is referred to as being "connected" or "coupled" to another component, the component may be directly connected or coupled to the other component, but may also be connected or coupled to the other component via another intervening component therebetween unless there is a particular description contrary thereto. In addition, this includes not only being "directly connected" or "physically connected", but also being "electrically coupled" with another intervening component therebetween. As used herein, the terms "transmit," "receive," and "communicate" encompass both direct and indirect communications. Throughout the disclosure, when a part "includes" or "comprises" an element, unless there is a particular description contrary thereto, it is understood that the part may further include other elements, not excluding the other elements.

Furthermore, in the disclosure, for an element expressed as a 'unit,' a 'module,' or the like, two or more elements may be combined into a single element, or a single element may be divided into two or more elements according to subdivided functions. These functions may be implemented using hardware or software or a combination of hardware and software. Furthermore, each element to be described below may further perform, in addition to its main functions, some or all of functions performed by another element, and some of the main functions of each element may be performed entirely by another component.

Singular expressions may include plural expressions unless the context clearly dictates otherwise. Terms used herein, including technical or scientific terms, are intended to have the same meaning as commonly understood by one of ordinary skill in the art described herein.

Throughout the disclosure, the word "or" is inclusive and not exclusive unless specifically stated to the contrary. Thus, the phrase "A or B" may refer to "A, B, or both" unless it is clearly stated otherwise or the context indicates otherwise. Throughout the disclosure, the expression "at least one of" or "one or more of" may indicate different combinations of one or more of the listed items or only any one of the listed items. For example, the expression "at least one of a, b, or c" indicates only a, only b, only c, both a and b, both a and c, both b and c, all of a, b, and c, or variations thereof.

In an embodiment of the disclosure, each block of a flowchart in the drawings and combinations of blocks of the flowchart may be performed by computer program instructions. These computer program instructions may be loaded into a processor of a general-purpose computer, special-purpose computer, or other programmable data processing equipment, and thus, the instructions performed by the processor of the computer or the other programmable data processing equipment generate a unit for performing functions specified in the flowchart block(s). The computer program instructions may also be stored in a computer-executable or computer-readable memory capable of directing the computer or the other programmable data processing equipment to implement functions in a specific manner, and thus, the instructions stored in the computer-executable or computer-readable memory are capable of producing items including instruction means for performing the functions described in the flowchart block(s). The computer program instructions may also be loaded into the computer or the other programmable data processing equipment, and thus, instructions for operating the computer or the other programmable data processing equipment by generating a computer-executed process when a series of operations are performed in the computer or the other programmable data processing equipment may provide operations for performing the functions described in the flowchart block(s).

In addition, each block may represent a portion of a module, segment, or code that includes one or more executable instructions for executing specified logical function(s). In an embodiment of the disclosure, functions mentioned in blocks may occur out of order. For example, two blocks illustrated in succession may be executed substantially simultaneously, or the blocks may sometimes be executed in reverse order depending on functions corresponding thereto.

Embodiments of the disclosure will be described more fully hereinafter with reference to the accompanying drawings so that they may be easily implemented by one of ordinary skill in the art. However, the disclosure may be implemented in different forms and should not be construed as being limited to embodiments set forth herein. In addition, parts not related to descriptions of the disclosure are omitted to clearly explain embodiments of the disclosure in the drawings, and like reference numerals denote like elements throughout.

Although an embodiment of the disclosure is hereinafter described with respect to a long-term evolution (LTE), LTE-Advanced (LTE-A), or 5th generation (5G) system as an example, the embodiments of the disclosure may be applied to other communication systems having similar technical backgrounds and channel configurations. For example, 5G-Advanced or $6^{th}$ generation (6G) (beyond 5G) developed after 5G mobile communication technology (New Radio (NR)) may be included, and 5G described below may be a concept including existing LTE, LTE-A, and other similar services. Furthermore, one of ordinary skill in the art will understand that embodiments of the disclosure are applicable to other communication systems through modifications not departing from the scope of the disclosure.

Terms used in the disclosure will now be briefly described and then an embodiment of the present disclosure will be described in detail.

Furthermore, the terms used herein are defined by taking functions described in the disclosure into account and may be changed according to a user's or operator's intent, or practices. Therefore, definition of the terms should be made based on the overall descriptions in the present specification.

In the disclosure, a base station (BS) may refer to an entity responsible for allocating resources to a user equipment (UE), and may be at least one of a next-generation Node B (gNode B), an evolved Node B (eNode B), a Node B (or an x Node B (x is an alphabet indicator including g and e)), a wireless access unit, a BS controller, a satellite, an airborne vehicle, or a node on a network, but the BS not limited thereto. A BS in the disclosure may refer to a BS itself, a cell, or a radio unit (RU) according to interpretation, and a target for exchanging messages with a UE may be a distributed unit (DU) or a centralized unit (CU) depending on its structure.

Furthermore, a UE may include a mobile station (MS), a cellular phone, a smart phone, a computer, a vehicle, a satellite, or a multimedia system capable of performing a communication function.

In addition, in the disclosure, a cell may refer to a geographical area covered by a BS in wireless communication. Cells may be classified into mega cells, macro cells, micro cells, and pico cells according to their size, but this is merely an example, and the type of cells is not limited thereto.

Also, in the disclosure, a DU is connected to an RU and a CU to run a radio link control (RLC) layer, a medium access control (MAC) layer, and a part of a physical (PHY) layer. In an embodiment of the disclosure, the DU may include a virtualized DU.

Furthermore, in the disclosure, a CU is a central entity and may include radio resource control (RRC), service data adaptation protocol (SDAP), and packet data convergence protocol (PDCP) layers. One CU may manage one or more DUs, and is connected to a DU via an F1 interface. In an embodiment of the disclosure, the CU may include a virtualized CU.

Also, in the disclosure, an RU is responsible for converting a radio signal into a digital signal for transmission over a packet network.

Furthermore, in the disclosure, a downlink (DL) may refer to a radio link through which a BS transmits data or a control signal to a UE. In detail, an LTE system employs an orthogonal frequency division multiplexing (OFDM) scheme for DL.

Furthermore, an uplink (UL) may refer to a radio link through which a UE transmits data or a control signal to a BS. Specifically, an LTE system employs a single carrier frequency division multiple access (SC-FDMA) scheme for UL.

As used in the following description, terms referring to broadcasting information, terms referring to control information, terms related to communication coverage, terms referring to state changes (e.g., events), terms referring to network entities, terms referring to messages, terms referring to components of an apparatus, etc., are exemplified for convenience of description. Thus, the disclosure is not limited to terms to be described later, and other terms having the equivalent technical meaning may be used.

Hereinafter, for convenience of description, the disclosure uses terms and names defined in the 3rd Generation Partnership Project (3GPP) LTE specifications or terms and names modified based on the defined terms and names. However, the disclosure is not limited to the terms and names but may also be applied identically to wireless communication systems that comply with other standards. For example, although an embodiment of the disclosure is described by taking a 5G NR wireless communication system as an example, the embodiment of the disclosure may also be applied to other communication systems having similar technical backgrounds and channel configurations. As another example, an embodiment of the disclosure may be applied to an LTE or LTE-A wireless communication system developed before an NR system, and the embodiment of the disclosure may also be applied to a wireless communication system developed after the NR system. Furthermore, it will be understood by one skilled in the art that an embodiment of the disclosure is applicable to other wireless communication systems through modifications without significantly departing from the scope of the disclosure.

FIG. 1 is a diagram of an architecture of a radio access network (RAN).

Referring to FIG. 1, a RAN is a network that provides radio access to a UE and may be considered as a set of BSs. The RAN may be largely split into a CU 10, a DU 20, and an RU 30. The topology of the RAN includes RUs, DUs and a CU in the ratio of N:M:1 (N>>M>>1). A cell corresponds to a geographical area covered by a BS in a wireless communication system, and at least one cell may exist for each BS.

The CU 10 may receive or transmit a signal from or to the DU 20 via the F1 interface. One CU 10 may be connected to a plurality of DUs 20, but when the number of DUs 20 is dynamically changed, the F1 interface may be violated.

The DU 20 may process a signal received from the RU 30 and transmit the processed signal to the CU 10 through the F1 interface. Furthermore, the DU 20 may receive a signal from the CU 10 via the F1 interface to process the signal or transmit it to the RU 30. The DU 20 may perform various RAN functions for signal processing. The RAN functions may include functions of an RLC layer, functions of a MAC layer, functions of a higher PHY (H-PHY) layer, or the like, but this is merely an example and the RAN functions are not limited to the above-described example.

The functions of an RLC layer, a MAC layer, and a PHY layer are described in detail.

The functions of the RLC layer may include at least some of the following functions:

Transfer of upper layer protocol data units (PDUs)

In-sequence delivery of upper layer PDUs

Out-of-sequence delivery of upper layer PDUs

Error correction through automatic repeat request (ARQ)

Concatenation, segmentation and reassembly of RLC service data units (SDUs)

Re-segmentation of RLC data

Reordering of RLC data

Duplicate detection

Protocol error detection

RLC SDU discard

RLC re-establishment

The in-sequence delivery function of the RLC layer may refer to a function of sequentially transferring RLC SDUs received from a lower layer to an upper layer and may include a function of, when one RLC SDU is segmented into multiple RLC SDUs and received, reassembling and transferring the multiple RLC SDUs. Furthermore, the in-sequence delivery function may include at least one of a function of reordering received RLC PDUs based on an RLC sequence number (SN) or a PDCP SN, a function of sequentially reordering RLC PDUs and recording lost RLC PDUs, or a function of submitting a status report for the lost RLC PDUs to a transmitting side. Furthermore, the in-sequence delivery function may include a function of requesting retransmission of the lost RLC PDUs and a function of sequentially transferring, when there is a lost RLC SDU, only RLC SDUs preceding the lost RLC SDU to the upper layer. In addition, the in-sequence delivery function may include a function of sequentially transferring all RLC SDUs received before a given timer is restarted to the upper layer when the timer expires even though there is a lost RLC SDU, or a function of sequentially transferring, to the upper layer, all RLC SDUs received up to a current time point when the given timer expires even though there is a lost RLC SDU.

The RLC layer may process RLC PDUs in an order that the RLC PDUs are received and transfer the RLC PDUs to the PDCP layer, regardless of the order of SNs. When segments of RLC SDUs are received, the RLC layer may concatenate the segments of RLC SDUs with segments stored in a buffer or segments to be subsequently received and reassemble them into a whole RLC PDU and then transfer the RLC PDU to the PDCP layer. Moreover, in NR, the RLC layer may not include a concatenation function, and the concatenation function may be performed at the MAC layer or be replaced with a multiplexing function of the MAC layer.

The functions of the MAC layer may include at least some of the following functions:

Mapping between logical channels and transport channels

Multiplexing/demultiplexing of the MAC SDUs

Scheduling information reporting

Error correction through hybrid ARQ (HARQ)

Priority handling between logical channels of one UE

Priority handling between UEs by means of dynamic scheduling

Multimedia broadcast/multicast service (MBMS) service identification

Transport format selection

Padding

The PHY layer may perform at least some of the following functions:

Data transmission and reception using electrical signals

Channel coding/decoding

Modulation/demodulation

Power control

Cell search

The PHY layer may perform channel coding and modulation on upper layer data to generate OFDM symbols and transmit the OFDM symbols via a radio channel. The PHY layer may also perform demodulation and channel decoding on OFDM symbols received via a radio channel and transfer data obtained as a result of the demodulation and channel decoding to the upper layer.

The RU 30 may transmit a signal to the DU 20 via a fronthaul interface. The RU 30 may also receive a signal from the DU 20 via the fronthaul interface. A fronthaul is the part of a network that connects the RU 30 at a cell site to DU 20, and may perform digital signal processing (DSP), power amplification, filtering, and other functions.

To efficiently use resources of the DU 20, the disclosure may provide a method of processing a packet in the DU 20 that is dynamically managed without violating the F1 interface. The CU 10, the DU 20, and the RU 30 may be run in a virtualized RAN as described below. Virtualization is a technology capable of expanding resources available on one device by consolidating and managing multiple physical resources.

Figure 2:
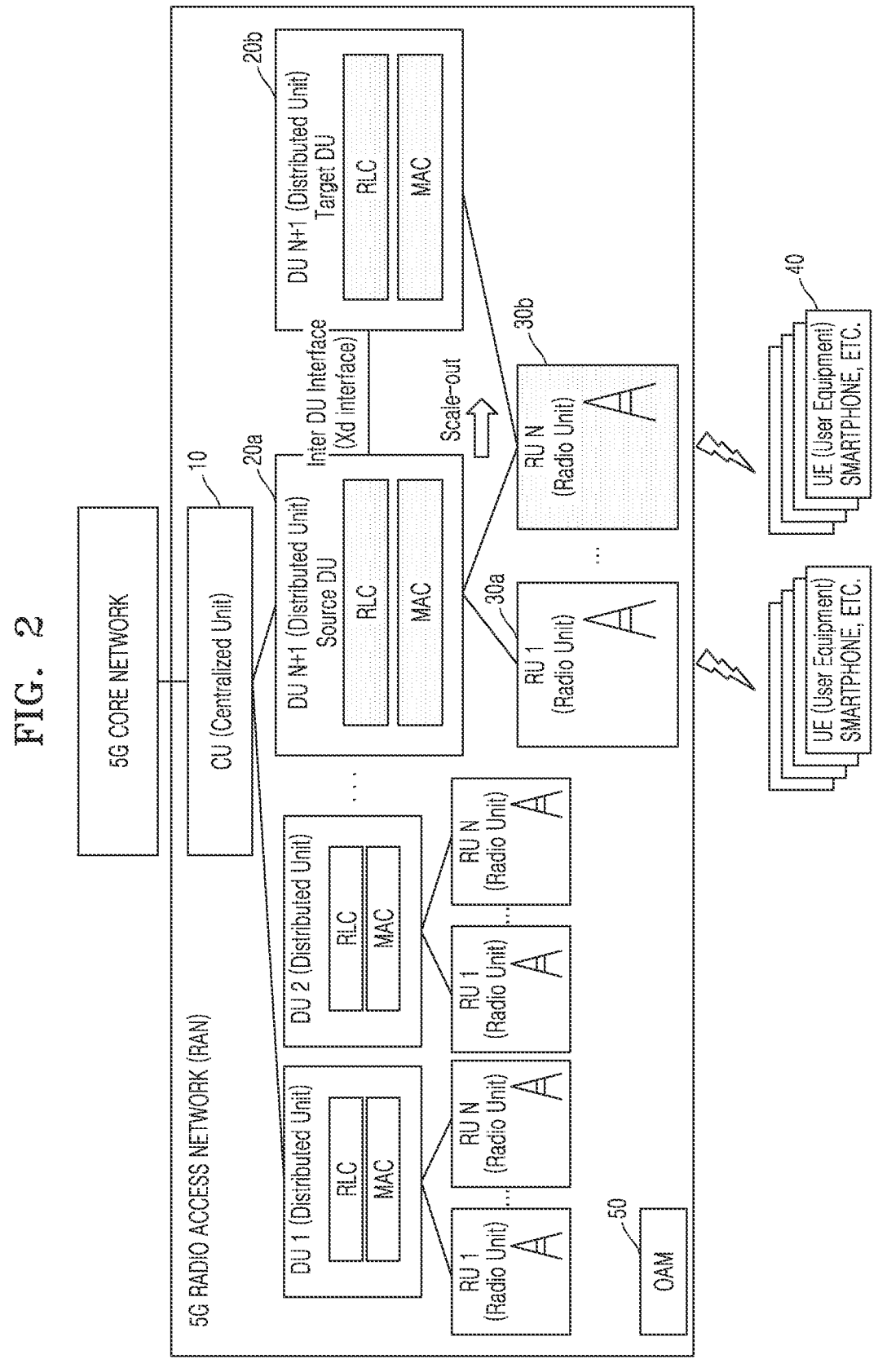
FIG. 2 is a diagram of an architecture of a RAN after dynamic scaling, according to an embodiment of the disclosure.

FIG. 2 is a diagram of an architecture of a RAN after dynamic scaling, according to an embodiment of the disclosure.

Referring to FIG. 2, a RAN is a network that provides radio access to UEs and may be considered as a set of BSs. The RAN may be largely split into the CU 10, the DU 20, and the RU 30.

To efficiently utilize resources of the DU 20, the disclosure proposes a packet processing method for dynamic allocation of a DU. While the CU 10 is connected to N DUs, when scaling out of the DU 20 is required based on traffic information or resource information, an N+1-th DU 20b may be added to the CU 10. In an embodiment of the disclosure, whether scaling out or scaling in of the DU 20 is required may be identified by operations, administration, and maintenance (OAM) 50. The OAM 50 may refer to O&M, OAM and provisioning (OAM&P), OAMP, a scaling agent, or a scaling controller, but is not limited thereto.

In an embodiment of the disclosure, the OAM 50 may compare traffic information with resource information of the DU 20 to determine whether scaling in or scaling out is required. For example, when a resource throughput of the DU 20 is greater than a preset value, scaling out may be performed. Alternatively, scaling in or out may be determined by comparing a difference between the resource throughput of the DU 20 and the amount of traffic with a preset value. Hereinafter, for convenience of description, the existing DU is referred to as a first DU 20a, and a DU added by scaling out is referred to as a second DU 20b.

Furthermore, according to scaling out of the second DU 20b, the OAM 50 may determine at least one RU 30b to be connected to the second DU 20b from among at least one RU 30a and 30b connected to the first DU 20a. The determined RU 30b may transmit and receive packets to and from the second DU 20b via a fronthaul interface. In an embodiment of the disclosure, the RU 30b may release the connection with the first DU 20a. Also, during scaling in, a fronthaul interface may be reconfigured between the RU 30b and the first DU 20a.

In an embodiment of the disclosure, an inter-DU interface may be configured between the first DU 20a and the second DU 20b. In the disclosure, the inter-DU interface refers to an interface for transmitting and receiving packets between DUs. The CU 10 recognizes up to the N DUs previously connected thereto but fails to recognize the second DU 20b dynamically added to the N DUs. Therefore, the second DU 20b may transmit and receive packets to and from the first DU 20a via the inter-DU interface by using F1 splitters in the first DU 20a and the second DU 20b. A detailed method of processing a packet by using the Inter-DU interface is described below in FIG. 6.

Figure 3:
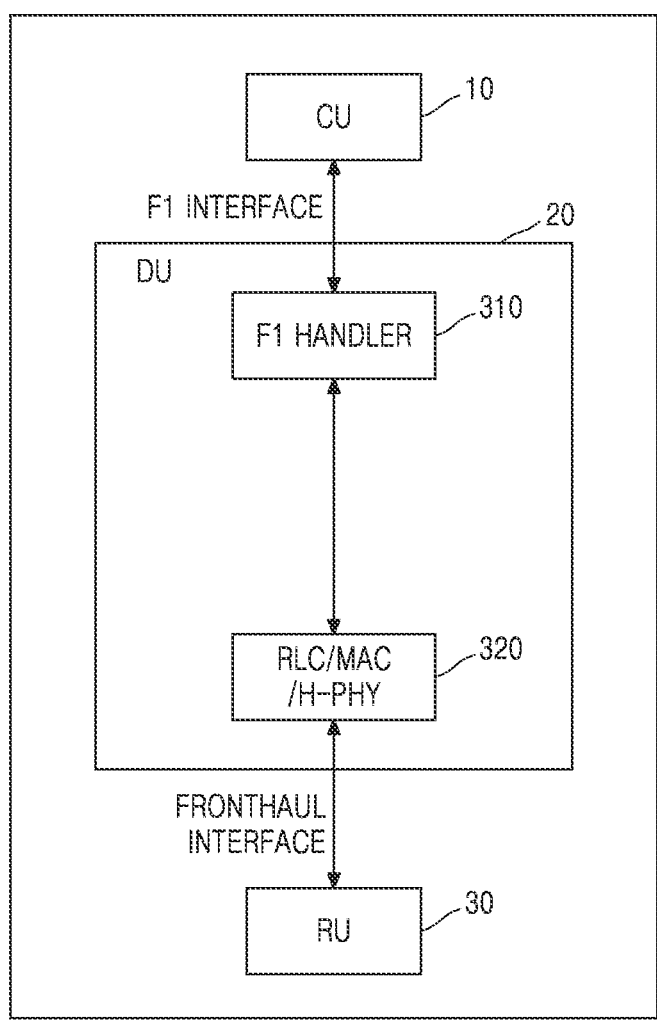
FIG. 3 is a diagram of an architecture and interfaces of a RAN.

FIG. 3 is a diagram of an architecture and interfaces of a RAN.

Referring to FIG. 3, the CU 10 may be connected to the DU 20 via an F1 interface. The DU 20 may be connected to the RU 30 through a fronthaul interface. The DU 20 includes an F1 handler 310 for controlling the F1 interface and RLC/MAC/H-PHY 320 for performing wireless network communication functions.

The RAN supports connection with one CU 10 for one DU 20 based on the F1 interface. The F1 handler 310 of the DU 20 connected to the CU 10 may be activated to establish a connection based on the F1 interface. The F1 interface may include an F1 control plane interface (F1-C) for control data and an F1 user plane interface (F1-U) for user data. An F1 interface protocol structure is defined in 3GPP TS38.470.

In a protocol structure for F1-C, a Transport Network Layer is based on Internet Protocol (IP) transport composed of a Stream Control Transmission Protocol (SCTP) on top of IP, and an application layer signaling protocol is referred to as F1 Application Protocol (F1AP). In a protocol structure for F1-U, the Transport Network Layer is based on IP transport composed of User Datagram Protocol (UDP) and General Packet Radio System (GPRS) Tunneling Protocol User Plane (GTP-U) on top of IP.

The CU 10 receives information about an IP of the DU 20 on the F1 interface and manages the DU 20 based on the received IP. Therefore, when a DU is dynamically scaled out as in an embodiment of the disclosure, a new DU is assigned a new IP different from that of the existing DU, and a CU fails to recognize and manage the new IP on the F1 interface.

When a DU is dynamically scaled out, a method of processing a packet without violating the F1 interface is described in detail below in FIG. 6.

In the RAN, the DU 20 may perform various RAN functions for signal processing. The RAN functions may include functions of an RLC layer, functions of a MAC layer, functions of a H-PHY layer, or the like, but this is merely an example and the RAN functions are not limited to the above-described example. Detailed network functions are as described with reference to FIG. 1.

The RU 30 may transmit and receive signals to and from the DU 20 through the fronthaul interface. The fronthaul is the part of a network that connects the RU 30 to the DU 20, and may perform DSP, power amplification, filtering, and other functions.

Figure 4:
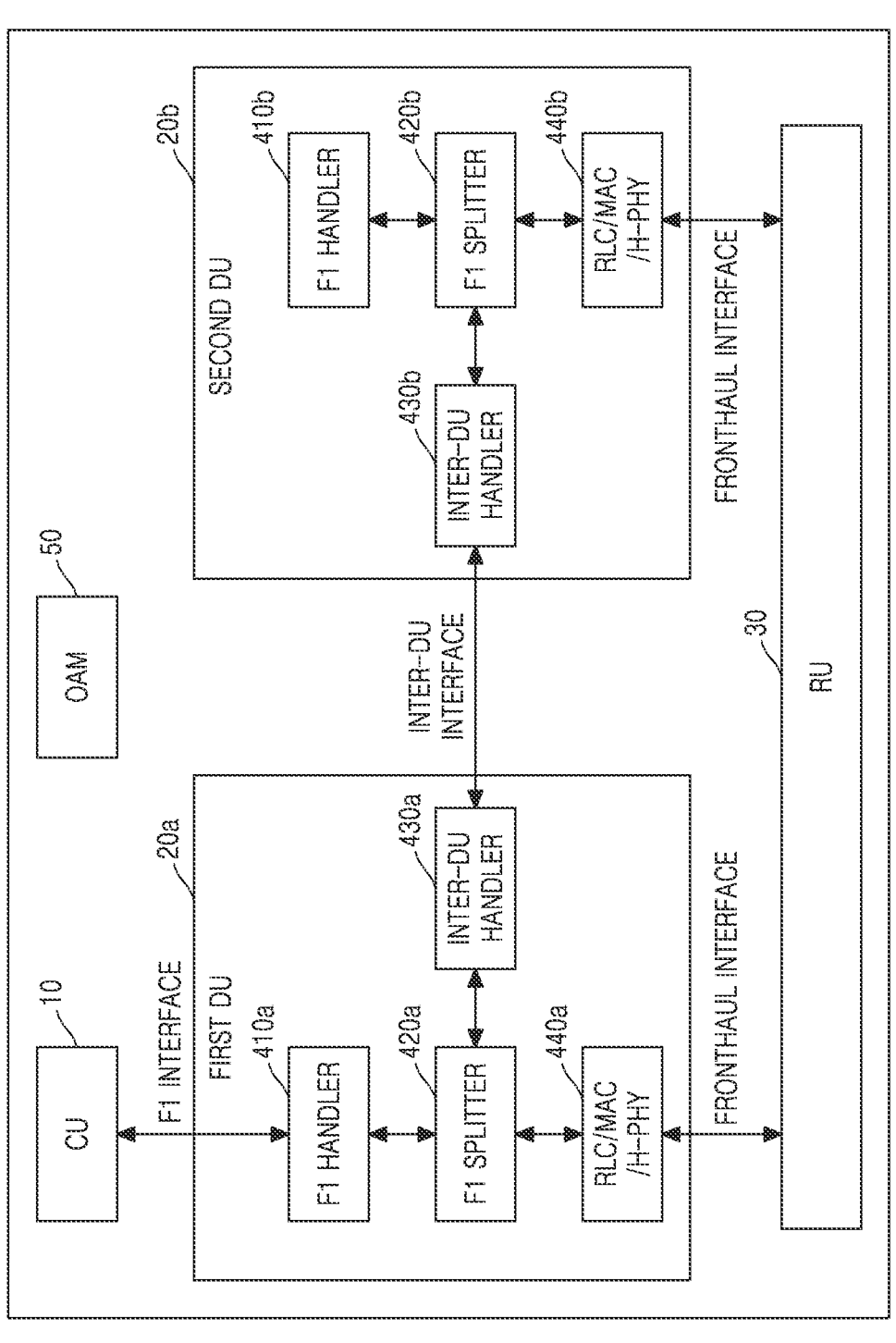
FIG. 4 is a diagram of an architecture and interfaces of a RAN after dynamic scaling, according to an embodiment of the disclosure.

FIG. 4 is a diagram of an architecture and interfaces of a RAN after dynamic scaling, according to an embodiment of the disclosure. Hereinafter, description of aspects similar to those described above may be omitted.

Referring to FIG. 4, the CU 10 is connected to the first DU 20*a* through an F1 interface. The first DU 20*a* is connected to the RU 30 through a fronthaul interface. According to scaling out of a DU, the first DU 20*a* is connected to at least one second DU 20*b* through an inter-DU interface. The inter-DU interface is an interface for transmitting and receiving packets between the first DU 20*a* and the second DU 20*b*, and is controlled by F1 splitters 420*a* and 420*b* and inter-DU handlers 430*a* and 430*b*. In an embodiment of the disclosure, there may be one or more second DUs 20*b*. When there are a plurality of second DUs 20*b*, the first DU 20*a* may configure an inter-DU interface with each of the plurality of second DUs 20*b*.

The CU 10 may configure the F1 interface with the first DU 20*a* and exchange packets with the first DU 20*a* through the F1 interface. The CU 10 may transmit and receive packets to and from the second DU 20*b* via the first DU 20*a*. For example, a downlink packet (DL packet) required to be transmitted to the second DU 20*b* may be transmitted from the CU 10 to the first DU 20*a* and then transmitted to the second DU 20*b* by the F1 splitter 420*a*. Alternatively, in the case of an uplink packet (UL packet), it may be transmitted from the second DU 20*b* to the first DU 20*a* via the inter-DU interface and then transmitted and/or forwarded to the CU 10.

The first DU 20*a* may be connected to the CU 10 via the F1 interface, to the second DU 20*b* via the inter-DU interface, and to the RU 30 via the fronthaul interface. In an embodiment of the disclosure, a connection between the CU 10 and the first DU 20*a* is activated based on the F1 interface, and a direct connection is not made between the CU 10 and the second DU 20*b*. For example, an F1 handler 410*a* of the first DU 20*a* becomes active to establish a connection with the CU 10 based on the F1 interface. An F1 handler 410*b* of the second DU 20*b* is maintained in an inactive state.

In an embodiment of the disclosure, the F1 splitter 420*a* of the first DU 20*a* may transmit a packet to a destination according to the content of the packet. For example, for a DL packet received from the CU 10 via the F1 interface, the first DU 20*a* may directly process the packet or transmit the packet to the second DU 20*b* according to the content of the packet. When the DL packet is transmitted to the second DU 20*b*, the DL packet may be transmitted via the inter-DU interface using the inter-DU handlers 430*a* and 430*b*. Furthermore, the F1 splitters 420*a* and 420*b* may each buffer a received packet therein. In addition, the F1 splitters 420*a* and 420*b* may each buffer the received packet in RLC.

In an embodiment of the disclosure, the inter-DU handlers 430*a* and 430*b* may configure the inter-DU interface between the first DU 20*a* and the second DU 20*b*, based on obtained inter-DU interface configuration information. The inter-DU interface configuration information may include configuration information for the F1 interface between the first DU 20*a* and the CU 10. In addition, the inter-DU handler 430*a* and 430*b* may exchange packets transmitted from the F1 splitters 420*a* and 420*b* with each other via the inter-DU interface.

In an embodiment of the disclosure, a MAC entity or a MAC scheduler of the first DU 20*a* may allocate resources for transmission of UL packets. Also, the MAC entity or the MAC scheduler may stop allocating resources for UL packets according to a request from a DU.

The first DU 20*a* may be connected to the RU 30 via the fronthaul interface. The fronthaul interface is the part of a network that connects a DU and a RU, and may perform DSP, power amplification, filtering, and other functions. The first DU 20*a* and the RU 30 may transmit and receive UL and/or DL packets through the fronthaul interface. In an embodiment of the disclosure, the OAM 50 may determine at least one RU to be connected to the DU according to scaling out. According to the scaling out, the determined RU may configure a fronthaul interface with a new DU and transmit and receive packets to and from the new DU.

The second DU 20*b* may be connected to the first DU 20*a* via the inter-DU interface and to the RU 30 via the fronthaul interface. In an embodiment of the disclosure, the OAM 50 may identify whether at least one second DU 20*b* is needed, based on traffic information or resource information. For example, when the amount of traffic is greater than the resource throughput of the first DU 20*a*, the OAM 50 may determine that a connection with the second DU 20*b* is required and activate the second DU 20*b*. In an embodiment of the disclosure, the second DU 20*b* may request inter-DU interface configuration information from the first DU 20*a*. The second DU 20*b* may configure the inter-DU interface with the first DU 20*a* based on inter-DU interface configuration information obtained in response to the request. The inter-DU interface configuration information may include configuration information for the F1 interface between the first DU 20*a* and the CU 10.

In an embodiment of the disclosure, the second DU 20*b* may transmit and receive packets to and from the CU 10 through the first DU 20*a*. Accordingly, because the second DU 20*b* does not configure an F1 interface with the CU 10, the F1 handler 410*b* may be maintained in an inactive state.

In an embodiment of the disclosure, the F1 splitter 420*b* of the second DU 20*b* may identify whether the second DU 20*b* is to directly process a packet or whether to transmit the packet to the RU 30 according to the content of the DL packet received from the first DU 20*a*. The F1 splitter 420*b* of the second DU 20*b* may buffer the received DL packet in the F1 splitter 420*b* itself or RLC. After migration of a UE (40 of FIG. 2) is completed, the second DU 20*b* may process the DL packet buffered in the F1 splitter 420*b* or the RLC based on a packet sequence. A MAC entity or a MAC scheduler of the second DU 20*b* may allocate resources for transmission of UL packets or stop the allocation of resources.

FIG. 5A is a diagram of a method of processing a packet according to a packet sequence, according to an embodiment of the disclosure.

FIG. 5A is an example of a header of an RLC layer. In the disclosure, hereinafter, acknowledged mode (AM) RLC or unacknowledged mode (UM) RLC is described. An RLC has three different modes (i.e., transparent mode (TM) RLC, UM RLC, and AM RLC). In the TM RLC, almost no processing is performed on data. In other words, in the TM RLC, there is no RLC header, and no reordering, no segmentation, and no reassembly occurs but only a buffering operation is performed. The UM RLC is a mode that does not require a response (acknowledgement (ACK)/negative ACK (NACK)), but an RLC header exists. In other words, UM RLC may perform buffering of data, generation of an RLC header, segmentation, modification of the RLC header based on the segmentation, reordering, and reassembly. AM RLC requires a response (ACK/NACK) and perform retransmission according to the response. That is, the AM RLC may further perform buffer retransmission and RLC control operations in addition to the functions of the UM RLC.

Because an RLC header does not exist in the TM RLC, an embodiment of the disclosure is described below with respect to the UM RLC and the AM RLC. An SN field 510 indicates a sequence number (SN) corresponding to an RLC SDU. For AM RLC, the SN is incremented by one for every RLC SDU, and for UM RLC, the SN is incremented by one for every segmented RLC SDU. An SO field 520 refers to a segmentation offset (SO), and indicates a position of an RLC SDU segment in bytes within the original RLC SDU. In detail, the SO field 520 indicates a position within the original RLC SDU to which a first byte of the RLC SDU segment in a data field corresponds.

FIG. 5B is a diagram of a method of processing a packet according to a packet sequence, according to an embodiment of the disclosure. FIG. 5B shows an example in which packet transmission and reception is not performed according to a packet sequence. In an embodiment of the disclosure, packets buffered in an F1 splitter or RLC need to processed according to a packet sequence so that radio link failure (RLF) does not occur and data may be transmitted and received without loss. When a portion of a packet (RLC PDU 530) with an SN of N among RLC PDUs is lost (540), transmission of the corresponding RLC PDU 530 may not be performed, and the whole packet with the SN of N may be discarded. When a portion of a packet with a corresponding SN is lost, the whole packet with the corresponding SN should not be received so that retransmission and/or re-reception may be performed according to a packet sequence.

Furthermore, when an RLC PDU 550 with an SN of N+a is received before reception of the RLC PDU 530 with the SN of N, the whole RLC PDU 530 with the SN of N may be discarded. When the reception of the RLC PDU 530 with the SN of N overlaps with the reception of the RLC PDU 550 with the SN of N+a, the packet with the SN of N may be discarded because transmission or reception is not performed based on the packet sequence.

In an embodiment of the disclosure, the RLC of the second DU 20b may transmit, to the RU 30, a DL packet received from the CU 10 and a DL packet received from the RLC of the first DU 20a, based on a packet sequence. After processing of the packet having the SN of N is completed, processing of a packet having a next SN may be performed.

Figure 6:
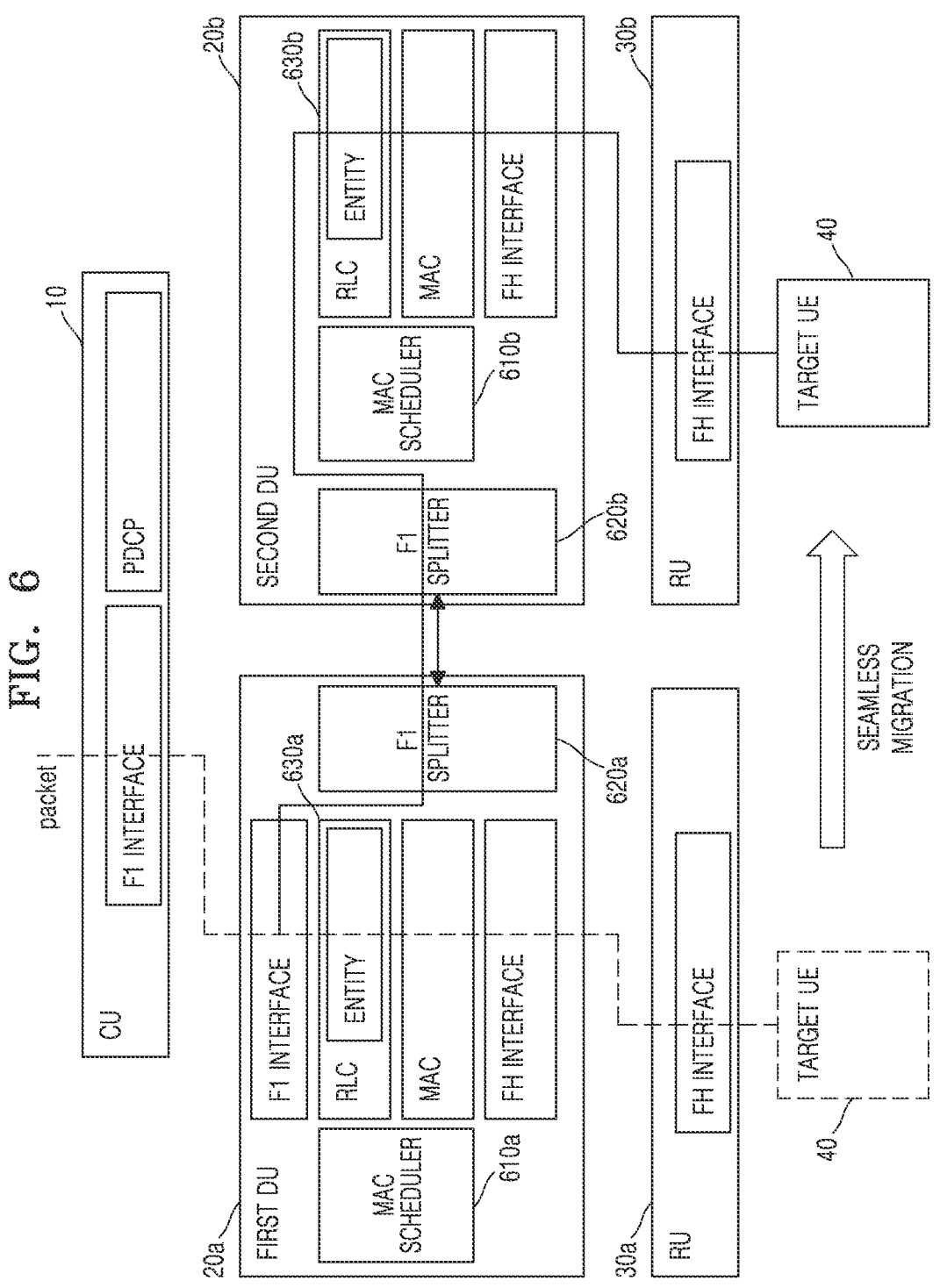
FIG. 6 is a diagram of a packet processing method after dynamic scaling, according to an embodiment of the disclosure.

FIG. 6 is a diagram of a packet processing scenario after dynamic scaling, according to an embodiment of the disclosure.

Referring to FIG. 6, a UE 40 is migrated from the first DU 20a to the second DU 20b in order to perform scaling out.

In an embodiment of the disclosure, based on resource information or traffic information, the OAM 50 may determine whether to perform scaling out and determine the UE 40 or the RU 30 to be scaled out. The disclosure provides a method of processing a UL packet transmitted by the UE 40 or a DL packet received by the UE 40 as the UE 40 is migrated from the first DU 20a to the second DU 20b. When packet transmission is suspended due to migration of the UE 40, a radio link failure (RLF) occurs and random access (RA) is performed. Because this does not match the purpose of processing traffic based on dynamic allocation of a DU, a method of processing corresponding packets is described below. Also, for convenience of description, an entity responsible for controlling resource allocation for packet transmission may be a component of a DU. For convenience of description, the entity responsible for controlling resource allocation for packet transmission may be referred to as a MAC scheduler.

In an embodiment of the disclosure, a UL packet transmitted by the UE 40 may be transmitted to the second DU 20b to be connected to the UE 40 according to scaling-out. For the UL packet, it may be transmitted based on resource allocation by MAC schedulers 610a and 610b. For example, the MAC schedulers 610a and 610b may allocate resources for a UL packet in response to a scheduling request for transmission of a UL packet from the UE 40. Transmission of a UL packet at the UE 40 may fail while performing a scaling out operation. In order to prevent the resulting data loss and RLF, the first DU 20a may stop allocating resources for the UL packet or transmission of the UL packet. In an embodiment of the disclosure, the first DU 20a may request a MAC scheduler 610a to stop allocating UL resources.

In an embodiment of the disclosure, the first DU 20a may receive the DL packet from the CU 10 through an F1 interface. Depending on the content of the DL packet, transmission to the UE 40 migrated to the second DU 20b may be requested, or transmission to the RU 30 or the second DU 20b connected to the UE 40 may be requested. The DL packet requested by the UE 40 may be buffered in an F1 splitter 620b in the second DU 20b until migration of the UE 40 is completed in order to be delivered to the UE 40 without loss. Also, the DL packet may be buffered in RLC 630b. The first DU 20a may transmit the DL packet to the second DU 20b via an inter-DU interface by using F1 splitters 620a and 620b. The F1 splitter 620b of the second DU 20b that has received the DL packet may buffer the DL packet in the F1 splitter 620b itself or the RLC 630b in order to transmit the DL packet to the UE 40 without loss.

In an embodiment of the disclosure, the first DU 20a may buffer, in RLC 630a, a DL packet not processed among DL packets having a destination of the UE 40. The DL packet buffered in the RLC 630a of the first DU 20a may be transmitted to the second DU 20b by using the F1 splitters 620a and 620b. In an embodiment of the disclosure, the DL packet buffered in the RLC 630a and values of an RLC entity may be transmitted to the second DU 20b. To prevent RLF from occurring, DL packets in an RLC buffer need to be transmitted while maintaining their sequence. Alternatively, the buffer (RLC buffer) of the RLC 630a in the first DU 20a may be copied to the second DU 20b.

In an embodiment of the disclosure, the second DU 20b may process received DL packets according to a packet sequence and transmit them to the RU 30. The RU 30 may directly process the received DL packets or transmit them to the UE 40. The second DU 20b may transmit a message indicating that the migration has been completed to the first DU 20a or the OAM 50. In an embodiment of the disclosure, the second DU 20b may transmit the message to the OAM 50 via the first DU 20a.

In an embodiment of the disclosure, after the migration is completed, the second DU 20b may request reallocation of resources for UL. The second DU 20*b* may request a MAC scheduler 610*b* to allocate resources for a UL packet. When UL resources are allocated by the MAC scheduler 610*b*, the UE 40 may transmit the UL packet using the corresponding resources.

In an embodiment of the disclosure, detailed descriptions of an operation overlapping an operation for performing scaling out from among operations for performing scaling in are omitted for brief description of the specification.

The OAM 50 may determine whether to perform scaling in based on resource information or traffic information, and determine the UE 40 or RU 30 to be scaled in. Hereinafter, a method of processing packets according to migration of the UE 40 from the second DU 20*b* to the first DU 20*a* for scaling in is provided. For a UL packet transmitted by the UE 40, the second DU 20*b* may request the MAC scheduler 610*b* to stop allocating resources for the UL packet. For a DL packet transmitted from the CU 10, the F1 splitter 620*a* of the first DU 20*a* may suspend transmission to the second DU 20*b*. The first DU 20*a* may buffer the DL packet received from the CU 10 in the F1 splitter 620*a*. In addition, the first DU 20*a* may buffer the DL packet received from the CU 10 in the RLC 630*a*. For a DL packet that is not processed within the RLC 630*b* of the second DU 20*b*, the DL packet may be transmitted to the first DU 20*a* according to migration of the UE 40. Also, a buffer (RLC buffer) of the RLC 630*b* in the second DU 20*b* may be copied to the first DU 20*a*. In response to the migration of the UE 40, the RLC buffer in the second DU 20*b* and values of an RLC entity may be copied to the first DU 20*a*. The first DU 20*a* may process received DL packets according to a packet sequence and transmit them to the RU 30 or the UE 40. The first DU 20*a* may transmit a message indicating that the migration has been completed to the OAM 50. When the migration is completed, the first DU 20*a* may request the MAC scheduler 610*a* to allocate resources for a UL packet. The UE 40 may transmit the UL packet using the allocated resources.

Figure 7:
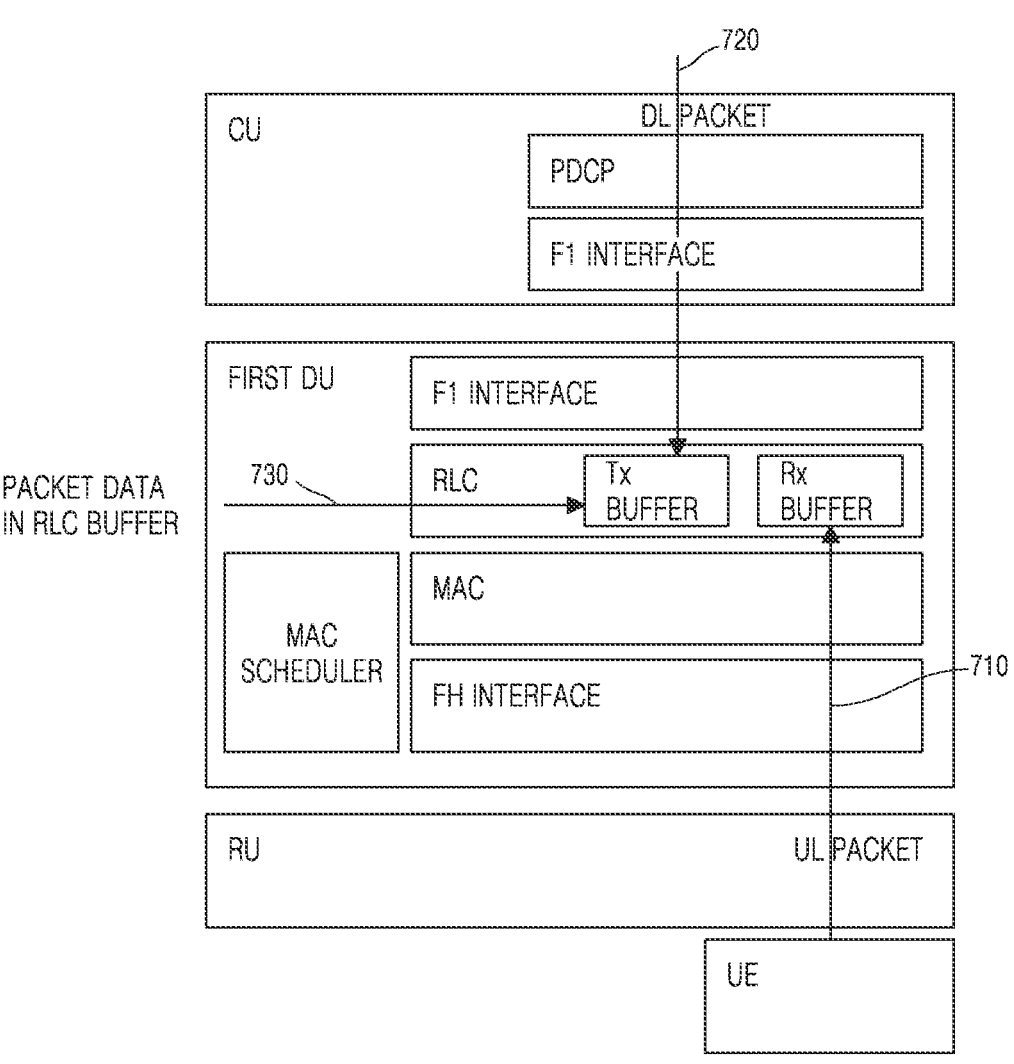
FIG. 7 is a diagram of types of user plane packets according to an embodiment of the disclosure.

FIG. 7 is a diagram of types of user plane packets according to an embodiment of the disclosure.

Referring to FIG. 7, when scaling in or out, three types of packets are migrated such that RLF may not occur and data may be transmitted and received without loss.

In the disclosure, packets are user plane packets and may be transmitted and received using a GTP-U protocol. A user plane packet may include a tunnel endpoint identifier (TEID). A TEID value is assigned when a data radio bearer (DRB) for a specific UE is generated, and is always associated with the specific UE. An F1 splitter may create and manage a table or hash table that stores TEID values created when the DRB is generated. In an embodiment of the disclosure, a table or hash table which stores TEID values may be referred to as a TEID table. The F1 splitter may identify information about a UE to which the packet has a destination using the generated TEID table.

A UL packet 710 transmitted by the UE 40 is required to be transmitted to a DU (i.e., a target DU) to be connected among the first DU 20*a* and the second DU 20*b* according to scaling in or out. Because transmission of the UL packet 710 to the target DU may fail until migration of the UE 40 is completed, the DU 20 may stop allocating resources for transmission of the UL packet 710. In an embodiment of the disclosure, the DU 20 may request a MAC scheduler to stop allocating resources for the UL packet 710. Due to stopping of UL resource allocation, the UE 40 is unable to transmit the UL packet 710. After migration of the UE 40 according to scaling in/out is completed, the DU 20 may request the MAC scheduler to allocate resources for the UL packet 710.

In response to the request, the MAC scheduler may allocate resources for the UL packet 710. The UE 40 may transmit the UL packet 710 using the allocated resources.

A DL packet 720 to be transmitted from the CU 10 to the DU 20 may be transmitted to the first DU 20*a* or the second DU 20*b* according to migration of the UE 40. The DL packet 720 may include a TEID, and a target UE may be determined based on the TEID. The first DU 20*a* may transmit the DL packet 720 to the second DU 20*b* via an inter-DU interface by using F1 splitters. The second DU 20*b* may buffer the received DL packet 720 in the F1 splitter. When scaling in is performed, the first DU 20*a* may suspend transmission of a DL packet to the second DU 20*b* and buffer the DL packet in the F1 splitter of the first DU 20*a*.

An unprocessed DL packet 730 in RLC of the DU 20 may be transmitted to a DU to be connected to the target UE. When scaling out, the unprocessed DL packet 730 in the RLC of the first DU 20*a* may be transmitted to the second DU 20*b* via the inter-DU interface by using the F1 splitters. The second DU 20*b* may buffer the received DL packet 730 in RLC of the second DU 20*b*. The second DU 20*b* may process, based on a packet sequence, a DL packet received from the CU 10 and a DL packet buffered in the RLC of the first DU 20*a*. When scaling in, the unprocessed DL packet 730 in the RLC of the second DU 20*b* may be transmitted to the first DU 20*a* via the inter-DU interface by using the F1 splitters.

Figure 8:
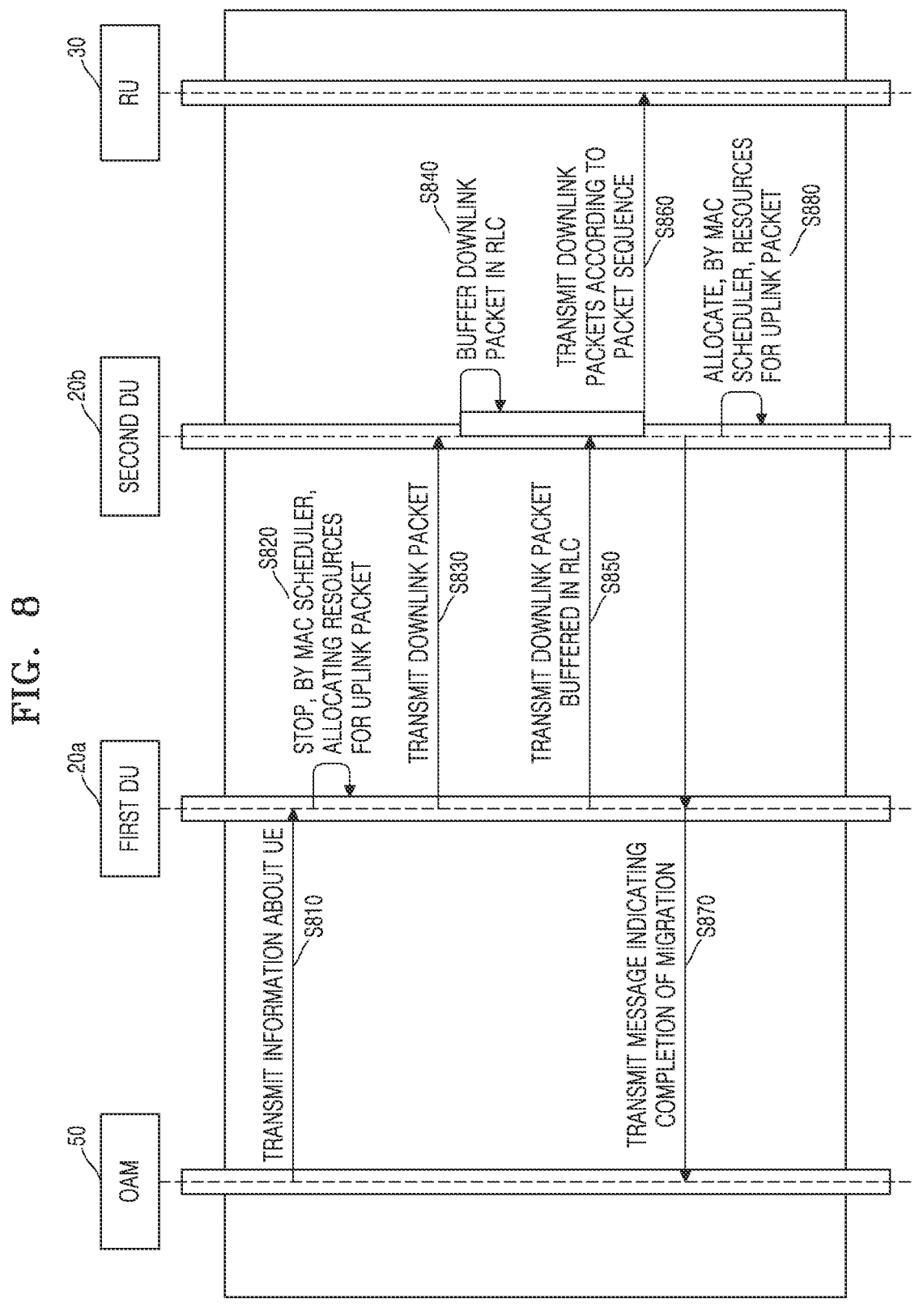
FIG. 8 is a diagram of a method of processing packets when scaling out, according to an embodiment of the disclosure.

FIG. 8 is a diagram of a method of processing packets when scaling out, according to an embodiment of the disclosure.

Referring to FIG. 8, when scaling out, the OAM 50 may control configuration of an inter-DU interface with the second DU 20*b*, based on resource usage of the first DU 20*a*. In an embodiment of the disclosure, the OAM 50 may periodically obtain information about the resource usage of the first DU 20*a*. Furthermore, the OAM 50 identifies, based on resource information and traffic information, the RU 30 (e.g., a first RU 30*b*) to be connected to the second DU 20*b* from among at least one RU connected to the first DU 20*a*. A detailed packet processing method is described.

In operation S810, the OAM 50 may transmit, to the first DU 20*a*, information about the UE 40 to be migrated when scaling out. In an embodiment of the disclosure, the OAM 50 may identify the UE 40 to be scaled out based on resource information and/or traffic information, and transmit information about the UE 40 to the first DU 20*a*.

The OAM 50 may transmit the information about the UE 40 to an F1 splitter of the first DU 20*a*. The F1 splitter of the first DU 20*a* may configure an inter-DU interface with the second DU 20*b*, based on the received information about the UE 40 and/or inter-DU interface configuration information. In addition, when processing a packet related to the UE 40, the first DU 20*a* may process the packet based on the received information about the UE 40.

In operation S820, the first DU 20*a* may transmit a request to stop allocating resources for a UL packet in order to suspend transmission of the UL packet. In an embodiment of the disclosure, a UL packet may refer to a UL packet transmitted from the UE 40 to the RU 30.

In an embodiment of the disclosure, the UE 40 may trigger a scheduling request for transmission of a UL packet. A MAC scheduler may allocate resources for the UL packet in response to the scheduling request from the UE 40. Before migration of the UE 40 is completed, the first DU 20*a* may transmit a request to stop allocating resources for the UL packet. The MAC scheduler of the first DU 20*a* may stop allocating resources for the UL packet in order to suspend transmission of the UL packet.

In operation S830, the first DU 20a may transmit a DL packet to the second DU 20b. In an embodiment of the disclosure, a DL packet may refer to a DL packet received from the CU 10 connected to the first DU 20a through an F1 interface.

In an embodiment of the disclosure, the first DU 20a may transmit, to the second DU 20b, a DL packet that has a destination of the UE 40 migrated to the second DU 20b from among DL packets received from the CU 10. The first DU 20a may identify whether to transmit the DL packet to the second DU 20b based on a TEID included in the DL packet. The first DU 20a may transmit the DL packet to the second DU 20b via the inter-DU interface by using the F1 splitters.

In operation S840, the second DU 20b may buffer the DL packet received from the first DU 20a. In an embodiment of the disclosure, the F1 splitter of the second DU 20b may store the received DL packet therein. In an embodiment of the disclosure, the second DU 20b may buffer the received DL packet in the F1 splitter according to a packet sequence to prevent RLF from occurring. Alternatively, the second DU 20b may buffer the received DL packet in RLC.

In operation S850, the first DU 20a may transmit, to the second DU 20b, a DL packet buffered in RLC of the first DU 20a. In an embodiment of the disclosure, a DL packet buffered in the RLC of the first DU 20a may refer to an unprocessed packet. For example, the DL packet may refer to a packet that has not been processed until scaling out according to the priority of packets. When scaling out, the first DU 20a may transmit, to the second DU 20b, a packet buffered in RLC and values of an RLC entity in the first DU 20a via the inter-DU interface by using the F1 splitters. The second DU 20b may buffer the received DL packet in RLC of the second DU 20b.

RLC may be categorized as TM RLC, UM RLC, or AM RLC. In an embodiment of the disclosure, the RLC of the first DU 20a may be UM RLC or AM RLC. Hereinafter, a UM or AM mode is described with reference to 3GPP TS38.322.

UM RLC is a mode that does not require a response (ACK/NACK), but an RLC header exists. In other words, UM RLC may perform buffering of data, generation of an RLC header, segmentation, modification of the RLC header based on the segmentation, reordering, and reassembly. AM RLC requires a response (ACK/NACK) and perform retransmission according to the response. That is, the AM RLC may further perform buffer retransmission and RLC control operations in addition to the functions of the UM RLC.

In operation S860, the second DU 20b may transmit DL packets to the RU 30 based on the packet sequence. The second DU 20b may process the DL packet in an RLC buffer of the first DU 20a, which is received in operation S850, and then process the DL packet stored in an RLC buffer in operation S840. In an embodiment of the disclosure, the DL packet received in operation S850 may be stored in the RLC buffer of the second DU 20b. The second DU 20b may process the received DL packets according to the packet sequence.

In operation S870, the second DU 20b may notify the first DU 20a or the OAM 50 that migration is completed. In an embodiment of the disclosure, the second DU 20b may notify the OAM 50 via the first DU 20a that migration is completed.

In operation S880, the second DU 20b may request reallocation of resources to resume transmission of the UL packet. In an embodiment of the disclosure, the second DU 20b may request a MAC scheduler therein to allocate resources for transmission of the UL packet. The MAC scheduler of the second DU 20b may allocate resources for the UL packet, based on the received information about the UE and the request.

FIG. 9 is a diagram of a method of processing packets when scaling in, according to an embodiment of the disclosure.

Referring to FIG. 9, when scaling in, the OAM 50 may control configuration of an inter-DU interface with the second DU 20b, based on resource usage of the first DU 20a. In an embodiment of the disclosure, the OAM 50 may periodically obtain information about the resource usage of the first DU 20a.

In operation S910, the OAM 50 may transmit, to the second DU 20b, information about the UE 40 to be migrated when scaling in. In an embodiment of the disclosure, the OAM 50 may transmit the information about the UE 40 to the second DU 20b through the first DU 20a. In other words, the OAM 50 may transmit the information about the UE 40 to the first DU 20a, and the first DU 20a may in turn transmit the received information about the UE 40 to the second DU 20a via the inter-DU interface. In an embodiment of the disclosure, the OAM 50 may identify the UE 40 to be scaled in based on resource information and/or traffic information, and transmit the information about the UE 40 to an F1 splitter of the first DU 20a or an F1 splitter of the second DU 20b. When processing a packet related to the UE 40, the first DU 20a and the second DU 20b may process the packet based on the received information about the UE 40.

In operation S920, the second DU 20b may transmit a request not to allocate resources for a UL packet in order to suspend transmission of the UL packet. In an embodiment of the disclosure, a UL packet may refer to a UL packet transmitted from the UE 40 to the RU 30. The second DU 20b may request a MAC scheduler therein to stop allocating resources in order to suspend transmission of the UL packet. The MAC scheduler of the second DU 20b may stop allocating resources for the UL packet in order to suspend transmission of the UL packet.

In operation S930, the first DU 20a may suspend transmission of a DL packet to the second DU 20b and buffer the DL packet in an F1 splitter of the first DU 20a. In an embodiment of the disclosure, a DL packet may refer to a DL packet received from the CU 10 connected to the first DU 20a through an F1 interface.

In an embodiment of the disclosure, the first DU 20a may suspend transmission of the DL packet to the second DU 20b according to scaling in. When scaling in is performed, the UE 40 may be migrated from the second DU 20b to the first DU 20a. Until the migration of the UE 40 is completed, the first DU 20a may buffer the DL packet in the F1 splitter.

In operation S940, the first DU 20a may notify the second DU 20b of start of buffering of the DL packet. The first DU 20a may suspend transmission of the DL packet to the second DU 20b according to operation S930, buffer the DL packet in the F1 splitter, and notify the second DU 20b of the start of the corresponding procedure.

In operation S950, the second DU 20b may transmit a DL packet in an RLC buffer of the second DU 20b to the first DU 20a. In an embodiment of the disclosure, the DL packet in the RLC buffer of the second DU 20b may refer to an unprocessed packet. In an embodiment of the disclosure, the second DU 20b may transmit the DL packet in RLC of the second DU 20*b* to the first DU 20*a*, based on the message received in operation S940. When scaling in, the second DU 20*b* may transmit, to the first DU 20*a*, a packet in the RLC buffer and values of an RLC entity in the second DU 20*b* via the inter-DU interface by using the F1 splitters. In addition, the RLC buffer of the second DU 20*b* may be copied to an RLC buffer of the first DU 20*a*.

In operation S960, the first DU 20*a* may transmit the DL packets to the RU 30 according to a packet sequence. The first DU 20*a* may process the DL packet in the RLC of the second DU 20*b*, which is received in operation S950, and process the DL packet stored in the RLC buffer in operation S930. In an embodiment of the disclosure, the first DU 20*a* may store the DL packet received in operation S950 in the RLC buffer therein. The first DU 20*a* may process the received DL packets according to the packet sequence.

In operation S970, the first DU 20*a* may notify the OAM 50 that migration is completed. The first DU 20*a* may transmit a message indicating completion of migration to the OAM 50.

In operation S980, the first DU 20*a* may request reallocation of resources to resume transmission of the UL packet. The first DU 20*a* may request a MAC scheduler therein to allocate resources for transmission of the UL packet. In an embodiment of the disclosure, the MAC scheduler of the first DU 20*a* may allocate resources for the UL packet, based on the received information about the UE 40 and the request.

Figure 10:
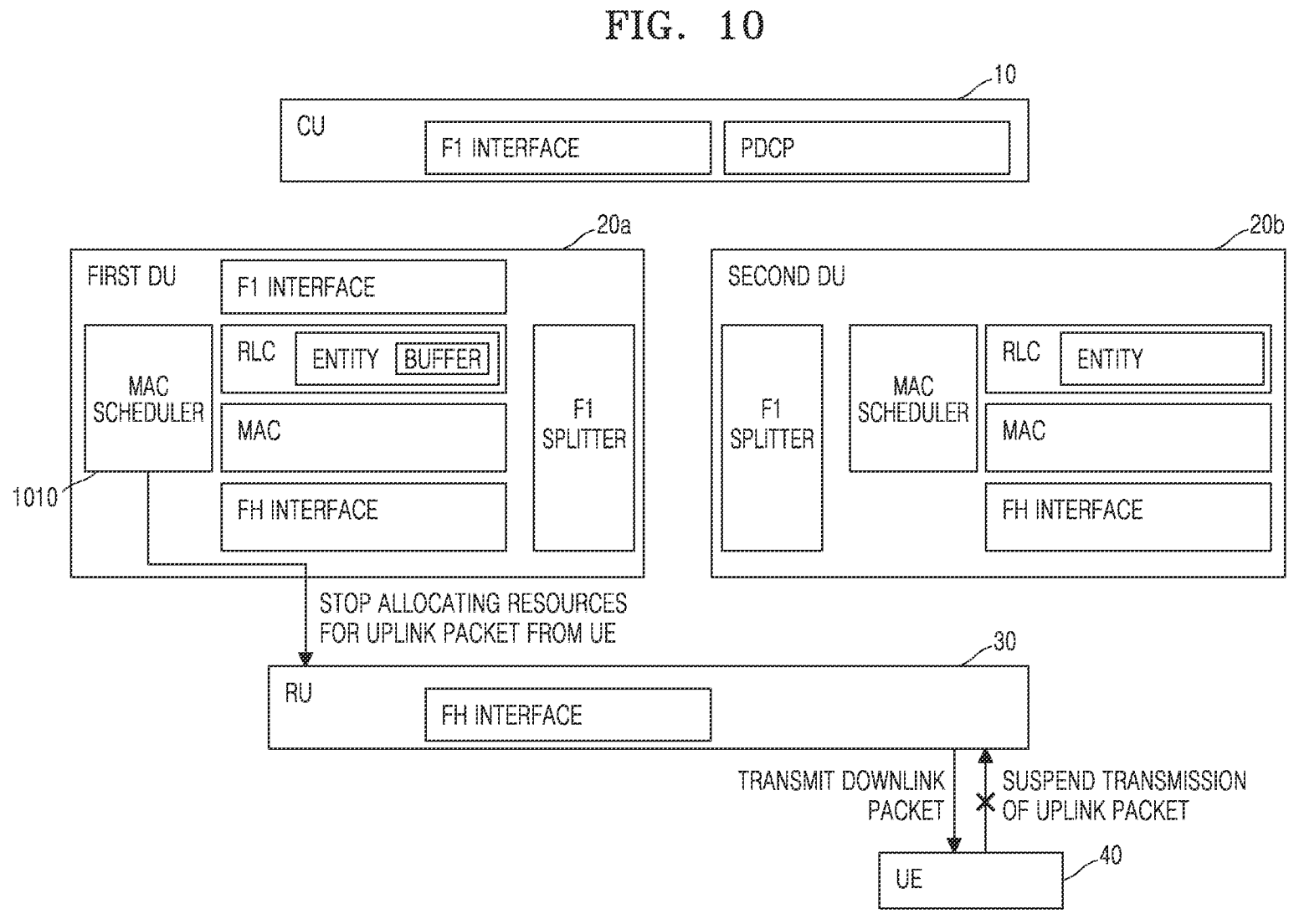

FIG. 10 is a diagram of a method of processing a UL packet, according to an embodiment of the disclosure.

Referring to FIG. 10, the UE 40 may transmit a UL packet to the RU 30. The UE 40 is allocated resources for transmission of a UL packet and is able to transmit the UL packet by using the resources. Allocation of uplink resources (UL resources) may be performed by a MAC entity or a MAC scheduler 1010 of the DU 20. In an embodiment of the disclosure, the MAC entity may receive a scheduling request from a UE that wants to transmit a UL packet, and allocate resources in response to the request. A procedure in which uplink scheduling (UL scheduling) is performed by a MAC entity is defined in 3GPP TS38.321 and described as follows.

A scheduling request may be used for requesting UL resources for a new transmission. The scheduling request message may be controlled by MAC. The MAC may use SR_counter that is a UE variable for scheduling request configuration. When the UE transmits a scheduling request on a physical uplink control channel (PUCCH), the MAC may compare the SR_counter with a preset value to determine whether to allocate resources for transmission of a UL packet. The MAC may inform the UE of resource allocation through an uplink grant message.

In an embodiment of the disclosure, the DU 20 that is to receive a UL packet is changed according to migration of the UE 40. To prevent the occurrence of RLF and perform scaling in/out without loss of the UL packet, the DU 20 may request the MAC scheduler 1010 to stop allocating resources for the UL packet. The MAC scheduler 1010 may stop allocating resources for UL based on the request from the DU 20. Alternatively, the MAC scheduler 1010 may not respond to a UE's scheduling request for transmission of a UL packet.

In an embodiment of the disclosure, when the migration of the UE 40 is completed, the DU 20 may request resource allocation for a UL packet. The MAC scheduler 1010 may allocate resources for uplink based on the request from the DU 20. The UE 40 may transmit the UL packet to the RU 30 using the allocated resources.

Figure 11:
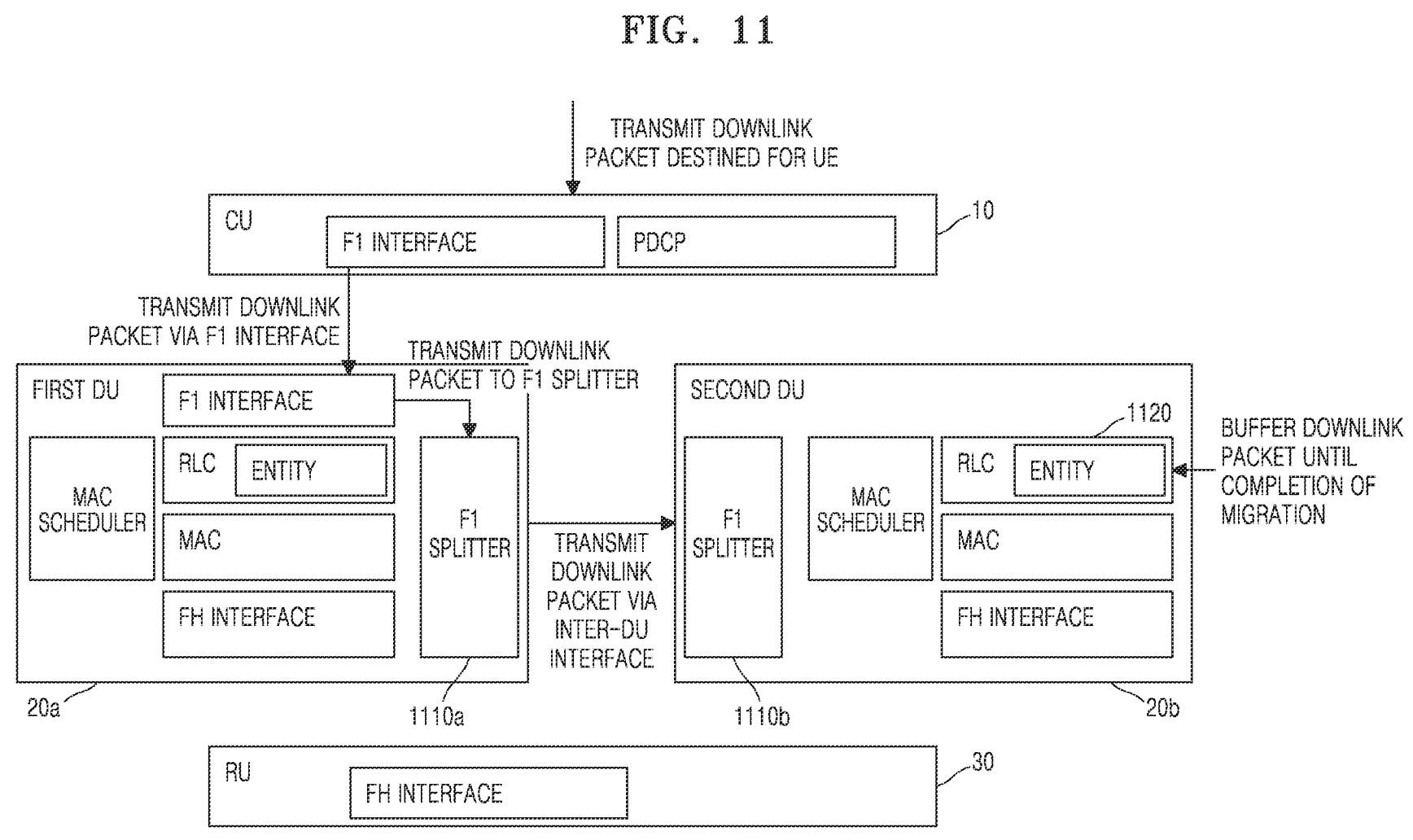
Figure 12:
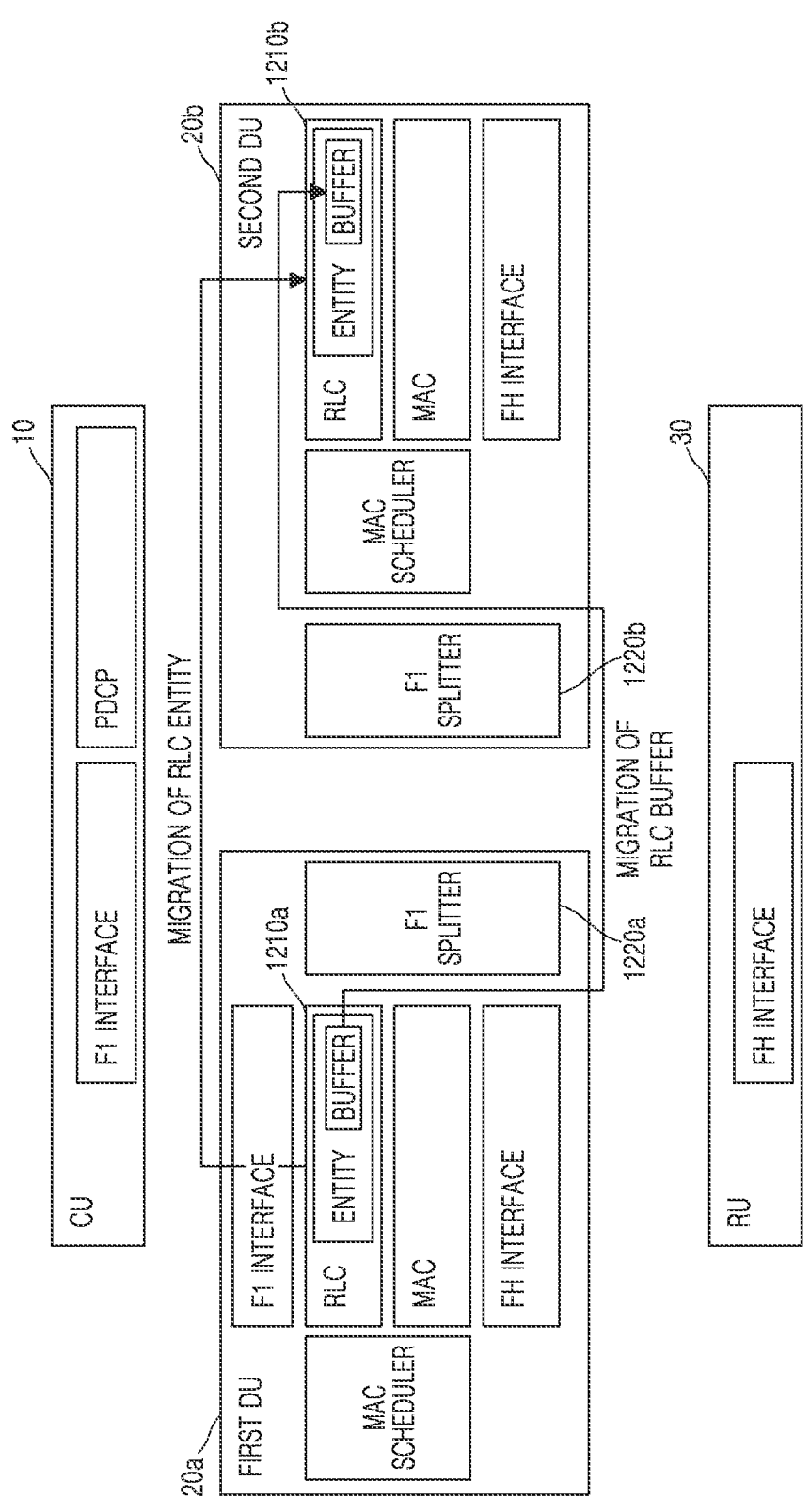
FIG. 12 is a diagram of a method of processing downlink packets, according to an embodiment of the disclosure.

FIGS. 11 and 12 are diagrams of a method of processing DL packets, according to an embodiment of the disclosure. FIG. 11 is a diagram illustrating a method of processing a DL packet transmitted by the CU 10, and FIG. 12 is a diagram illustrating a method of processing a DL packet that is unprocessed and buffered in RLC of the DU 20.

Referring to FIG. 11, the CU 10 may transmit a DL packet to the first DU 20*a* via an F1 interface. When the DL packet is a user plane packet, the DL packet may include a TEID, and a target UE may be determined based on the TEID. Depending on scaling in/out, the target UE 40 may be migrated from the first DU 20*a* to the second DU 20*b* or from the second DU 20*b* to the first DU 20*a*.

The first DU 20*a* may transmit the DL packet received from the CU 10 to the second DU 20*b*. The first DU 20*a* may transmit a DL packet to the second DU 20*b* via an inter-DU interface by using F1 splitters. After receiving the DL packet, the second DU 20*b* may buffer the DL packet in the F1 splitter. The second DU 20*b* may buffer the DL packet in the F1 splitter according to a packet sequence in order to transmit the DL packet to the UE 40 according to the packet sequence. Alternatively, the second DU 20*b* may buffer the received DL packet in RLC.

As the migration operation is completed, the second DU 20*b* may transmit the DL packet buffered in the F1 splitter to the UE 40. The second DU 20*b* may transmit the DL packet to the UE 40 or the RU 30 connected to the UE 40. After processing a DL packet received from RLC of the first DU 20*a*, the second DU 20*b* may process the DL packet received from the CU 10.

Detailed descriptions of operations for performing scaling in, which are also included in operations for performing scaling out, may be omitted.

When scaling in, the first DU 20*a* may suspend transmission of a DL packet received from the CU 10 to the second DU 20*b*. The first DU 20*a* may buffer the DL packet received from the CU 10 in the F1 splitter. After migration of the UE 40 is completed, the first DU 20*a* may transmit the DL packet buffered in the F1 splitter to the UE 40 or the RU 30 connected to the UE 40.

Referring to FIG. 12, the DU 20 may buffer an unprocessed DL packet in RLC. When scaling out, the first DU 20*a* may transmit the DL packet buffered in RLC 1210*a* to the second DU 20*b* by using F1 splitters 1220*a* and 1220*b*. The DL packet buffered in the RLC 1210*a* may refer to an unprocessed packet. Alternatively, based on the migration, a buffer (RLC buffer) of the RLC 1210*a* in the first DU 20*a* and values of an RLC entity may be copied together to the second DU 20*b*. The second DU 20*b* may buffer the received DL packet in RLC 1210*b* therein. In an embodiment of the disclosure, the first DU 20*a* may transmit, to the F1 splitter 1220*b* in the second DU 20*b*, the DL packet buffered in the RLC 1210*a* of the first DU 20*a* by using the F1 splitter 1220*a* in the first DU 20*a*. The F1 splitter 1220*b* in the second DU 20*b* may transmit the DL packet to the RLC 1210*b* in the second DU 20*b*. The RLC 1210*b* in the second DU 20*b* may buffer the received DL packet therein. In an embodiment of the disclosure, a DL packet transmitted from the CU 10 to the second DU 20*b* and the DL packet from the RLC 1210*a* in the first DU 20*a* may be processed based on a packet sequence.

When scaling in, the second DU 20*b* may transmit a DL packet buffered in the RLC 1210*b* to the first DU 20*a*. A buffer of the RLC 1210*b* and values of an RLC entity in the second DU 20*b* may be copied together to the first DU 20*a* based on the migration.

Figure 13:
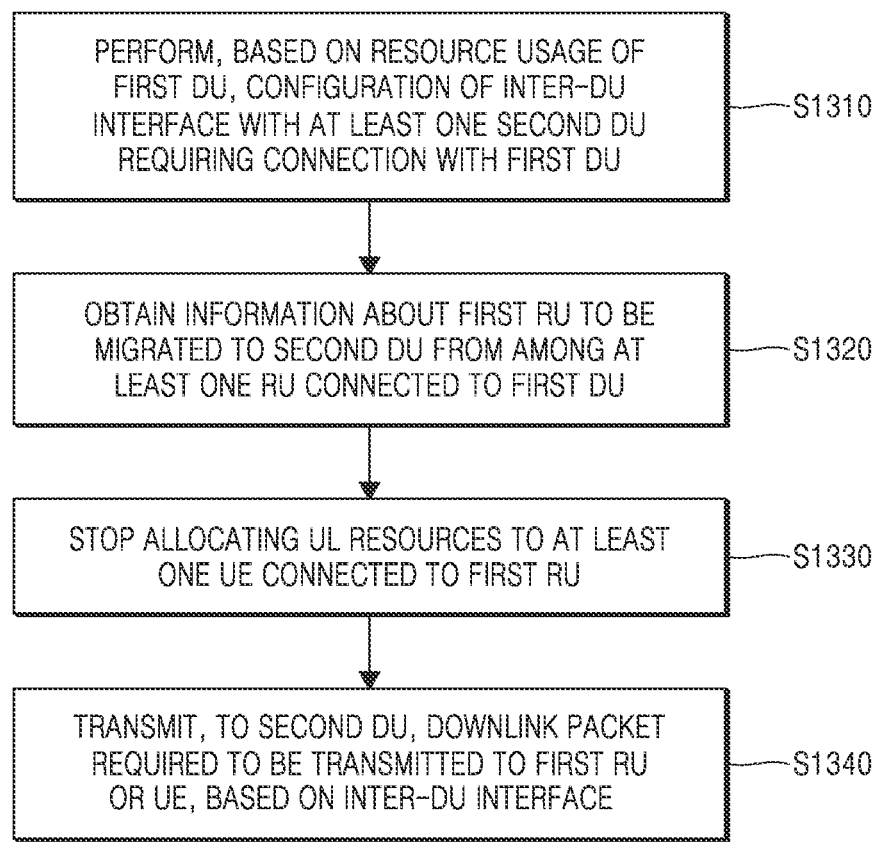
FIG. 13 is a flowchart of a method of processing packets when performing scaling out, according to an embodiment of the disclosure.

FIG. 13 is a flowchart of a method of processing packets when performing scaling out, according to an embodiment of the disclosure.

Referring to FIG. 13, a method, performed by the first DU 20*a*, of processing packets according to dynamic allocation of a DU is provided.

In operation S1310, the first DU 20*a* may perform, based on resource usage of the first DU 20*a*, configuration of an inter-DU interface with at least one second DU 20*b* requiring a connection with the first DU 20*a*.

In an embodiment of the disclosure, the OAM 50 may obtain resource information including resource usage from the first DU 20*a*. The OAM 50 may identify, based on resource information or traffic information, whether the second DU 20*b* is needed or whether a connection with the second DU 20*b* is required. The OAM 50 may activate the second DU 20*b* based on an identification result, and transmit the identification result to the first DU 20*a* or the second DU 20*b*. The first DU 20*a* and the second DU 20*b* may configure an inter-DU interface for transmission and reception of packets therebetween, based on inter-DU interface configuration information. The second DU 20*b* may transmit and receive packets to and from the first DU 20*a* via the inter-DU interface by using F1 splitters.

In operation S1320, the first DU 20*a* may obtain information about the first RU 30*b* to be migrated to the second DU 20*b* from among at least one RU 30 connected to the first DU 20*a*.

In an embodiment of the disclosure, the OAM 50 may identify an RU or UE to be migrated, based on resource information or traffic information. The OAM 50 may transmit the identification result to the first DU 20*a* or the second DU 20*b*. In addition, the OAM 50 may transmit information about the first RU 30*b* to the first DU 20*a* or the second DU 20*b*. The information about the first RU 30*b* may include information about at least one UE connected to the first RU 30*b*. Information about a UE may include a TEID. The first DU 20*a* or the second DU 20*b* may process a packet based on the TEID.

In operation S1330, the first DU 20*a* may stop allocating UL resources to at least one UE connected to the first RU 30*b*.

In an embodiment of the disclosure, the UE may request resource allocation for transmission of a UL packet. A MAC scheduler may allocate, based on the request, resources for transmission of a UL packet. The first DU 20*a* may request the MAC scheduler to stop allocating resources for a UL packet until migration of the UE is completed. The MAC scheduler may stop, based on the request, allocating resources for the UL packet.

In operation S1340, the first DU 20*a* may transmit, to the second DU 20*b*, a DL packet required to be transmitted to the first RU 30*b*, based on the inter-DU interface.

In an embodiment of the disclosure, the DL packet may refer to a DL packet received from the CU 10 connected to the first DU 20*a* via an F1 interface. Also, the DL packet may refer to a DL packet not processed and buffered in RLC of the first DU 20*a*.

In an embodiment of the disclosure, the DL packet may include a TEID. The F1 splitter may identify a target UE for the DL packet based on the TEID. The F1 splitter of the first DU 20*a* may identify, based on the TEID, whether to transmit the DL packet to the second DU 20*b*. In addition, the first DU 20*a* may transmit only a DL packet that has a destination of the target UE among DL packets buffered in the RLC to the second DU 20*b* based on the TEID.

The second DU 20*b* may buffer the received DL packet in the F1 splitter or RLC. After completion of migration of the UE, the second DU 20*b* may process the received DL packet based on a packet sequence.

Figure 14:
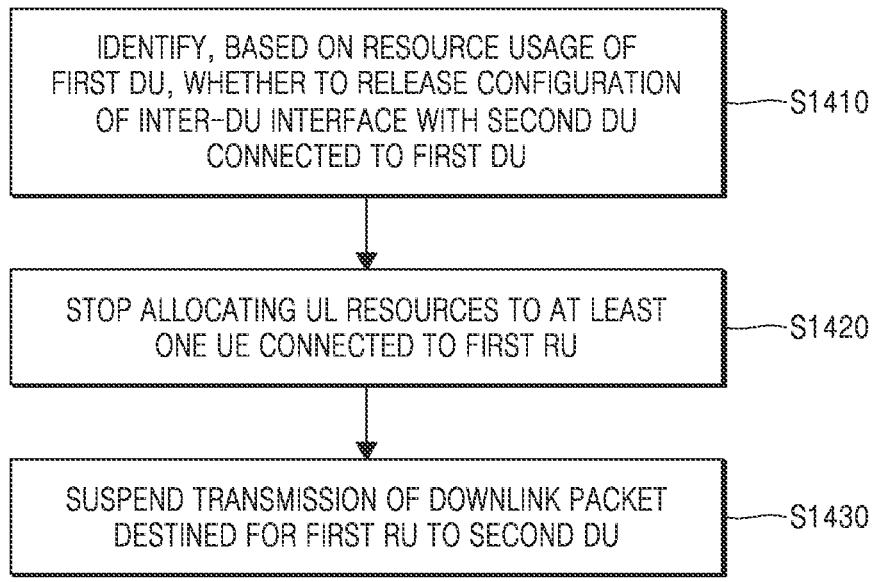
FIG. 14 is a flowchart of method of processing a packet when performing scaling-in, according to an embodiment of the disclosure.

FIG. 14 is a flowchart of a method of processing packets when performing scaling-in, according to an embodiment of the disclosure.

Referring to FIG. 14, a method, performed by the first DU 20*a*, of processing packets according to dynamic allocation of a DU is provided. Hereinafter, a detailed description of an operation also included in the operations illustrated in FIG. 13 are omitted for brief description of the specification.

In operation S1410, the first DU 20*a* may identify, based on resource usage of the first DU 20*a*, whether to release configuration of the inter-DU interface with the second DU 20*b* connected to the first DU 20*a*.

In an embodiment of the disclosure, the OAM 50 may periodically obtain resource information regarding the first DU 20*a*. The OAM 50 may identify, based on the obtained resource information or traffic information, whether the second DU 20*b* is needed or whether a connection with the second DU 20*b* is required. For example, the OAM 50 may deactivate the second DU 20*b* when determining that the first DU 20*a* alone is capable of processing traffic. The OAM 50 may transmit an identification result to the first DU 20*a* or the second DU 20*b*.

In operation S1420, resource allocation for UL packets from at least one UE connected to the first RU 30*b* may be stopped.

In an embodiment of the disclosure, the resource allocation for a UL packet may be performed by a MAC scheduler. Resource allocation for a UL packet to be transmitted by a UE may be stopped until migration of the UE is completed. The second DU 20*b* may request the MAC scheduler to stop allocating resources for the UL packet. The MAC scheduler may stop, based on the request, allocating resources for the UL packet. After the migration of the UE is completed, the UE may be allocated resources for a UL packet, and transmit the UL packet to the first RU 30*b* based on the resources.

In operation S1430, the first DU 20*a* may suspend transmission of a DL packet, which has a destination of the first RU 30*b*, to the second DU 20*b*.

In an embodiment of the disclosure, the DL packet may refer to a DL packet received from the CU 10 connected to the first DU 20*a* via an F1 interface. Also, the DL packet may refer to a DL packet buffered in RLC of the first DU 20*a*.

In an embodiment of the disclosure, when the migration of the UE is performed according to scaling in, the first RU 30*b* connected to the UE may be reconnected to the first DU 20*a*. Accordingly, the first DU 20*a* may suspend transmission of a DL packet to the second DU 20*b*. The first DU 20*a* may buffer the DL packet received from the CU 10 in an F1 splitter. After the migration of the UE is completed, the first DU 20*a* may process the DL packet based on a packet sequence.

Figure 15:
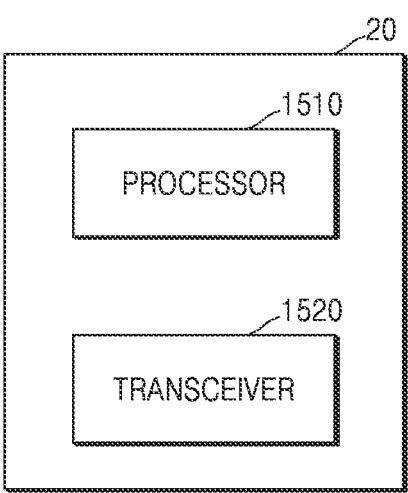
FIG. 15 is a block diagram of a distributed unit (DU) according to an embodiment of the disclosure.

FIG. 15 is a block diagram of the DU 20 according to an embodiment of the disclosure.

Referring to FIG. 15, the DU 20 may include a processor 1510, a transceiver 1520, and a memory. However, the components of the DU 20 are not limited thereto. For example, the DU 20 may include more or fewer components than those described above. In an embodiment of the disclosure, the processor 1510, the memory, and the transceiver 1520 may be implemented as a single chip.

The processor 1510 may be configured as one or a plurality of processors. In this case, the one or the plurality of processors may be a central processing unit (CPU), an application processor (AP), a digital signal processor (DSP), or the like.

The processor 1510 may control a series of processes such that the DU 20 may operate according to the embodiment of the disclosure. For example, the processor 1510 may receive control signals and data signals via the transceiver 1520 and process the received control signals and data signals. The processor 1510 may transmit the processed control signals and data signals via the transceiver 1520 and detect an event. Furthermore, the processor 1510 may control input data derived from the received control signals and data signals to be processed according to a predefined operation rule or an artificial intelligence (AI) model stored in the memory. The processor 1510 may write data to and read data from memory. Also, the processor 1510 may perform protocol stack functions required by communication standards. According to an embodiment of the disclosure, the processor 1510 may include at least one processor. In an embodiment of the disclosure, a part of the transceiver 1520 or the processor 1510 may be referred to as a communication processor (CP). The processor 1510 may perform control over UL packets or DL packets according to the embodiment of the present disclosure. In addition, the processor 1510 may perform configurations for an F1 interface, an inter-DU interface, and a fronthaul interface.

The memory may store data and programs necessary for operations of the DU 20. Furthermore, the memory may store control information or data in a signal obtained by the DU 20. Furthermore, the memory may store predefined operation rules or AI models used by the DU 20. The memory may include storage media such as read-only memory (ROM), random access memory (RAM), hard discs, compact disc-ROM (CD-ROM), and digital video discs (DVDs), or a combination of the storage media. In addition, the memory may not exist separately but may be included in the processor 1510. The memory may include volatile memory, non-volatile memory, or a combination of volatile and non-volatile memory. The memory may provide stored data according to a request from the processor 1510.

The transceiver 1520 collectively refers to a transmitter and a receiver, and the transceiver 1520 of the DU 20 may transmit and receive signals to and from a BS or network entity. The signals may include control information and data. To achieve this, the transceiver 1520 may include a radio frequency (RF) transmitter for up-converting and amplifying a frequency of a signal to be transmitted and an RF receiver for low-noise amplifying a received signal and down-converting its frequency. However, this is merely an embodiment of the transceiver 1520, and components of the transceiver 1520 are not limited to the RF transmitter and the RF receiver. Furthermore, the transceiver 1520 may receive a signal via a radio channel and output the signal to the processor 1510 and transmit a signal output from the processor 1510 via a radio channel. The transceiver 1520 may transmit and receive UL or DL packets, based on the F1 interface, the inter-DU interface, and the fronthaul interface.

Figure 16:
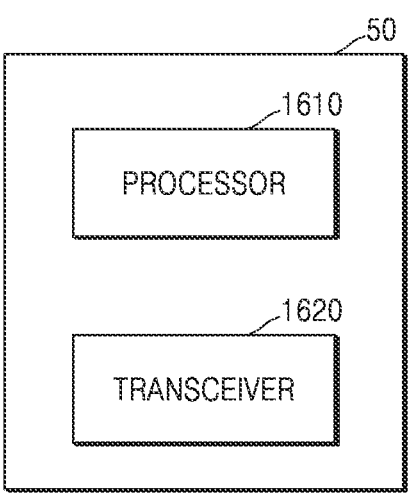
FIG. 16 is a block diagram of an operations, administration, and maintenance (OAM) entity according to an embodiment of the disclosure.

FIG. 16 is a block diagram of an OAM according to an embodiment of the disclosure.

Referring to FIG. 15, the OAM 50 according to the disclosure may include a processor 1610, a transceiver 1620, and a memory. However, the components of the OAM 50 are not limited thereto. For example, the OAM 50 may include more or fewer components than those described above. In an embodiment of the disclosure, the processor 1610, the memory, and the transceiver 1620 may be implemented as a single chip.

The processor 1610 may be configured as one or a plurality of processors. In this case, the one or the plurality of processors may be a CPU, an AP, a DSP, or the like.

The processor 1610 may control a series of processes such that the OAM 50 may operate according to the embodiment of the disclosure. For example, the processor 1610 may receive control signals and data signals via the transceiver 1620 and process the received control signals and data signals. The processor 1610 may transmit the processed control signals and data signals via the transceiver 1620 and detect an event. Furthermore, the processor 1610 may control input data derived from the received control signals and data signals to be processed according to a predefined operation rule or an AI model stored in the memory. The processor 1610 may write data to and read data from memory. Also, the processor 1610 may perform protocol stack functions required by communication standards. According to an embodiment of the disclosure, the processor 1610 may include at least one processor. In an embodiment of the disclosure, a part of the transceiver 1620 or the processor 1610 may be referred to as a CP. According to the embodiment of the disclosure, the processor 1610 enables the OAM 50 to identify the need for an additional connection of a DU, based on traffic information or resource information.

The memory may store data and programs necessary for operations of the OAM 50. Furthermore, the memory may store control information or data in a signal obtained by the OAM 50. Furthermore, the memory may store predefined operation rules or AI models used by the OAM 50. The memory may include storage media such as ROM, RAM, hard discs, CD-ROM, and DVDs, or a combination of the storage media. In addition, the memory may not exist separately but may be included in the processor 1610. The memory may include volatile memory, non-volatile memory, or a combination of volatile and non-volatile memory. The memory may provide stored data according to a request from the processor 1610.

The transceiver 1620 collectively refers to a transmitter and a receiver, and the transceiver 1620 of the OAM 50 may transmit and receive signals to and from a BS or network entity. The signals may include control information and data. To achieve this, the transceiver 1620 may include an RF transmitter for up-converting and amplifying a frequency of a signal to be transmitted and an RF receiver for low-noise amplifying a received signal and down-converting its frequency. However, this is merely an embodiment of the transceiver 1620, and components of the transceiver 1620 are not limited to the RF transmitter and the RF receiver. Furthermore, the transceiver 1620 may receive a signal via a radio channel and output the signal to the processor 1610 and transmit a signal output from the processor 1610 via a radio channel. The transceiver 1620 may receive traffic information or resource information and, based on the received traffic or resource information, transmit a result of identifying the need for an additional connection of a DU.

In an embodiment of the disclosure, a method, performed by a first DU, of performing communication in a wireless communication system may include performing, based on resource usage of the first DU, configuration of an inter-DU interface with a second DU requiring a connection with the first DU, obtaining information about at least one first RU to be migrated to the second DU from among at least one RU connected to the first DU, stopping resource allocation for UL packets associated with at least one UE connected to the first RU, and transmitting, based on the configured inter-DU interface, to the second DU, a DL packet required to be transmitted to the first RU or the at least one UE.

In an embodiment of the disclosure, the resource allocation for UL packets may be stopped by a MAC scheduler in the first DU.

In an embodiment of the disclosure, the first DU and the second DU may respectively include F1 splitters, and the DL packet may be buffered in at least one of RLC or the F1 splitter in the second DU.

In an embodiment of the disclosure, the DL packet may include at least one of a DL packet required to be transmitted to the first RU or the at least one UE from among DL packets received from a CU connected to the first DU, or a DL packet required to be transmitted to the first RU or the at least one UE from among DL packets buffered in RLC of the first DU.

In an embodiment of the disclosure, the first DU and the second DU may respectively include F1 splitters, the DL packets received from the CU may be buffered in the F1 splitter of the second DU, and the DL packets transmitted from the RLC of the first DU may be buffered in the RLC of the second DU.

In an embodiment of the disclosure, the first DU may obtain information about the at least one UE connected to the first RU, and identify, based on the obtained information, DL packets transmitted to the second DU.

In an embodiment of the disclosure, information about the at least one UE may include a TEID.

In an embodiment of the disclosure, the first DU and the second DU may respectively include F1 splitters, and the first DU may transmit and receive packets to and from the second DU via the inter-DU interface by using the F1 splitters.

In an embodiment of the disclosure, the RLC in the first DU may be in a UM mode or an AM mode.

In an embodiment of the disclosure, the first DU may receive a UL packet from the second DU, based on a resource allocation request for the UL packet from the second DU.

In an embodiment of the disclosure, based on the resource usage of the first DU, the first DU may release the configuration of the inter-DU interface with the second DU.

In an embodiment of the disclosure, the first DU may suspend transmission of DL packets to the second DU, the DL packets having a destination for the first RU, and resource allocation for UL packets associated with the at least one UE connected to the first RU may be stopped.

In an embodiment of the disclosure, a method, performed by a second DU, of performing communication in a wireless communication system may include performing, based on resource usage of a first DU, configuration of an inter-DU interface with the first DU, obtaining information about at least one first RU to be migrated to the second DU from among at least one RU connected to the first DU, and receiving, based on the configured inter-DU interface, from the first DU, a DL packet required to be transmitted to the first RU or at least one UE connected to the first RU, and resource allocation for a UL packet associated with the at least one UE may be stopped based on a request from the first DU.

In an embodiment of the disclosure, the first DU and the second DU may respectively include F1 splitters, and the DL packet received from the first DU may be buffered in at least one of RLC or the F1 splitter in the second DU.

In an embodiment of the disclosure, the first DU and the second DU may respectively include F1 splitters, and the second DU may buffer a DL packet received from a CU in the F1 splitter of the second DU and buffer a DL packet received from RLC of the first DU in the RLC of the second DU.

In an embodiment of the disclosure, the first DU and the second DU may respectively include F1 splitters, the second DU may transmit and receive packets to and from the first DU via the inter-DU interface by using the F1 splitters.

In an embodiment of the disclosure, the second DU may request resources for the UL packet and transmit, to the first DU, the UL packet based on the request.

In an embodiment of the disclosure, the second DU may release the configuration of the inter-DU interface with the first DU, based on the resource usage of the first DU.

In an embodiment of the disclosure, a method, performed by an OAM entity, of performing communication in a wireless communication system, determining, based on resource usage of a first DU, whether to configure an inter-DU interface with a second DU, identifying at least one first RU to be migrated to the second DU from among at least one RU connected to the first DU, and transmitting information about the first RU to the first DU or the second DU, and control of a DL packet and a UL packet may be performed between the first DU and the second DU based on the information about the first RU.

A computer-readable storage medium may be provided in the form of a non-transitory storage medium. In this regard, the term 'non-transitory storage medium' only means that the storage medium does not include a signal (e.g., an electromagnetic wave) and is a tangible device, and the term does not differentiate between where data is semi-permanently stored in the storage medium and where the data is temporarily stored in the storage medium. For example, the 'non-transitory storage medium' may include a buffer for temporarily storing data.

According to an embodiment of the disclosure, methods according to the embodiments of the disclosure may be included in a computer program product when provided. The computer program product may be traded, as a product, between a seller and a buyer. The computer program product may be distributed in the form of a computer-readable storage medium (e.g., CD-ROM) or distributed (e.g., downloaded or uploaded) on-line via an application store or directly between two user devices (e.g., smartphones). For online distribution, at least a part of the computer program product (e.g., a downloadable app) may be at least transiently stored or temporally generated in the computer-readable storage medium such as a memory of a server of a manufacturer, a server of an application store, or a relay server.

The embodiments of the disclosure disclosed in the specification and the drawings provide merely specific examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A method, performed by a first distributed unit (DU), of performing communication in a wireless communication system, the method comprising:

performing, based on resource usage of the first DU, configuration of an inter-DU interface with a second DU requiring a connection with the first DU;

obtaining information about at least one first radio unit (RU) to be migrated to the second DU from among at least one RU connected to the first DU;

stopping resource allocation for at least one uplink packet associated with at least one user equipment (UE) connected to the first RU; and transmitting, based on the configured inter-DU interface, to the second DU, at least one downlink packet required to be transmitted to the first RU or the at least one UE, wherein the first DU comprises a first F1 splitter, wherein the second DU comprises a second F1 splitter, and wherein packets are transmitted and received between the first DU and the second DU via the inter-DU interface using the first F1 splitter and the second F1 splitter.

2. The method of claim 1, wherein the stopping of the resource allocation for the at least one uplink packet is performed by a media access control (MAC) scheduler in the first DU.

3. The method of claim 1, wherein the at least one downlink packet is buffered in at least one of a radio link control (RLC) in the second DU or the second F1 splitter.

4. The method of claim 1, wherein in case that the at least one downlink packet comprises a downlink packet, from among downlink packets received from a centralized unit (CU) connected to the first DU, that is required to be transmitted to the first RU or to the at least one UE, the downlink packet received from the CU is buffered in the second F1 splitter, and wherein in case that the at least one downlink packet comprises a downlink packet, from among downlink packets buffered in a radio link control (RLC) of the first DU, that is required to be transmitted to the first RU or to the at least one UE, the downlink packet from the RLC of the first DU is buffered in an RLC of the second DU.

5. The method of claim 4, wherein the RLC of the first DU is in an unacknowledged mode (UM) or an acknowledged mode (AM).

6. The method of claim 1, further comprising:

obtaining information about the at least one UE connected to the first RU; and identifying, based on the obtained information, downlink packets transmitted to the second DU, wherein the information about the at least one UE comprises a tunnel endpoint identifier (TEID).

7. The method of claim 1, further comprising receiving at least one uplink packet from the second DU, based on a resource allocation request for the at least one uplink packet from the second DU.

8. The method of claim 1, further comprising, based on the resource usage of the first DU, releasing the configuration of the inter-DU interface with the second DU.

9. The method of claim 8, wherein the releasing of the configuration of the inter-DU interface with the second DU comprises:

suspending transmission, to the second DU, of downlink packets having a destination for the first RU, and wherein resource allocation for uplink packets associated with the at least one UE connected to the first RU is stopped.

10. A method, performed by a second distributed unit (DU), of performing communication in a wireless communication system, the method comprising:

performing, based on resource usage of a first DU, configuration of an inter-DU interface with the first DU;

obtaining information about at least one first radio unit (RU) to be migrated to the second DU from among at least one RU connected to the first DU; and receiving, based on the configured inter-DU interface, from the first DU, at least one downlink packet required to be transmitted to the first RU or at least one user equipment (UE) connected to the first RU, wherein resource allocation for at least one uplink packet associated with the at least one UE is stopped based on a request from the first DU, wherein the first DU comprises a first F1 splitter, wherein the second DU comprises a second F1 splitter, and wherein packets are transmitted and received between the second DU and the first DU via the inter-DU interface using the first F1 splitter and the second F1 splitter.

11. The method of claim 10, wherein the at least one downlink packet received from the first DU is buffered in at least one of a radio link control (RLC) in the second DU or the second F1 splitter in the second DU.

12. The method of claim 10, wherein the first DU comprises a first F1 splitter, wherein the second DU comprises a second F1 splitter, and wherein in case that the at least one downlink packet comprises a downlink packet, from among downlink packets received from a centralized unit (CU) connected to the first DU, that is required to be transmitted to the first RU or the at least one UE, the downlink packet received from the CU is buffered in the second F1 splitter, and wherein in case that the at least one downlink packet comprises a downlink packet, from among downlink packets buffered in a radio link control (RLC) of the first DU, that is required to be transmitted to the first RU or the at least one UE, the downlink packet from the RLC of the first DU is buffered in an RLC of the second DU.

13. The method of claim 12, wherein the RLC of the first DU is in an unacknowledged mode (UM) or an acknowledged mode (AM).

14. The method of claim 10, wherein the at least one downlink packet is identified based on information about the at least one UE connected to the first RU, wherein the information about the at least one UE comprises a tunnel endpoint identifier (TEID).

15. The method of claim 10, further comprising:

requesting the resource allocation for at least one uplink packet; and transmitting, to the first DU, the at least one uplink packet based on the requesting for resource allocation.

16. The method of claim 10, further comprising, based on the resource usage of the first DU, releasing the configuration of the inter-DU interface with the first DU.

17. A method, performed by an operations, administration, and maintenance (OAM) entity, of performing communication in a wireless communication system, the method comprising:

determining, based on resource usage of a first distributed unit (DU), whether to configure an inter-DU interface with a second DU;

identifying at least one first radio unit (RU) to be migrated to the second DU from among at least one RU connected to the first DU; and transmitting information about the first RU to the first DU or the second DU, wherein control of at least one downlink packet and at least one uplink packet is performed between the first DU and the second DU, based on the information about the first RU, wherein the first DU comprises a first F1 splitter, wherein the second DU comprises a second F1 splitter, and wherein packets are transmitted and received between the second DU and the first DU via the inter-DU interface using the first F1 splitter and the second F1 splitter.

* * * * *